US012611615B2

(12) United States Patent  
Glezer et al.

(10) Patent No.: US 12,611,615 B2  
(45) Date of Patent: Apr. 28, 2026

(54) REED-TYPE THERMAL TECHNOLOGIES

(71) Applicant: Georgia Tech Research Corporation, Atlanta, GA (US)

(72) Inventors: Ari Glezer, Atlanta, GA (US); Thomas M. Crittenden, Atlanta, GA (US); Sourabh Kumar Jha, Atlanta, GA (US); Pablo Hidalgo, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 716 days.

(21) Appl. No.: 17/762,177

(22) PCT Filed: Sep. 23, 2020

(86) PCT No.: PCT/US2020/052272  
§ 371 (c)(1),  
(2) Date: Mar. 21, 2022

(87) PCT Pub. No.: WO2021/061813  
PCT Pub. Date: Apr. 1, 2021

(65) Prior Publication Data  
US 2022/0379235 A1 Dec. 1, 2022

Related U.S. Application Data

(60) Provisional application No. 62/904,314, filed on Sep. 23, 2019.

(51) Int. Cl.  
B01D 5/00 (2006.01)  
F25B 39/04 (2006.01)  
F25D 23/00 (2006.01)

(52) U.S. Cl.  
CPC ............ B01D 5/0033 (2013.01); F25B 39/04 (2013.01); F25D 23/003 (2013.01)

(58) Field of Classification Search  
CPC ...... B01D 5/0033; F25B 39/04; F25D 23/003  
(Continued)

(56) References Cited

U.S. PATENT DOCUMENTS

| | | | | |
|---|---|---|---|---|
| 3,587,730 A | * | 6/1971 | Milton | F28F 13/187 |
| | | | | 165/181 |
| 6,588,497 B1 | * | 7/2003 | Glezer | F15D 1/02 |
| | | | | 165/84 |

(Continued)

OTHER PUBLICATIONS

Glezer,Ari; Mittal,Rajat; Alben,Silas, Enhanced Forced Convection Heat Transfer using Small Scale Vorticity Concentrations Effected by Flow Driven, Aeroelastically Vibrating Reeds, Aug. 3, 2016, https://apps.dtic.mil/sti/citations/AD1021521 (Year: 2016).*

(Continued)

*Primary Examiner* — Claire E Rojohn, III  
(74) *Attorney, Agent, or Firm* — TROUTMAN PEPPER LOCKE LLP; Ryan A. Schneider; Korbin M. Blunck

(57) ABSTRACT

Low Reynolds number forced convection heat transport within the fin channels enhanced by deliberate formation of unsteady, small-scale vortical motions using elastically fluttering thin-film reeds. The vortical motions substantially increase the local heat transfer coefficient at the channel walls and mixing between the wall thermal boundary layers and the cooler core flow. The flow mechanisms associated with production, advection and dissipation of these small-scale motions are investigated in a modular, high aspect ratio channel using micro-PIV, video imaging of the reed motion, and hot-wire anemometry. The global heat transfer enhancement in a modular heat sink prototype shows that the reed-induced small scale motions increase the turbulent kinetic energy of the flow even when the base flow undergoes transition to turbulence, leading to an increase in the local and global Nusselt number that is sustained at higher Re and a minor relative increase in losses.

12 Claims, 32 Drawing Sheets

(58) Field of Classification Search
USPC .......................................................... 62/498
See application file for complete search history.

(56) References Cited

U.S. PATENT DOCUMENTS

| | | | | |
|---|---|---|---|---|
| 7,258,464 | B2 * | 8/2007 | Morris | F21V 29/15 |
| | | | | 362/264 |
| 7,550,901 | B2 * | 6/2009 | Chrysler | F04D 33/00 |
| | | | | 417/322 |
| 7,692,922 | B2 * | 4/2010 | Leija | F04D 33/00 |
| | | | | 165/185 |
| 8,596,337 | B2 * | 12/2013 | Weaver | F21V 29/74 |
| | | | | 165/80.3 |
| 9,523,367 | B2 * | 12/2016 | Lucas | H10N 30/50 |
| 9,702,357 | B2 * | 7/2017 | Tsai | H05K 7/20172 |
| 10,480,502 | B2 * | 11/2019 | Hirata | F04B 45/047 |
| 11,242,241 | B2 * | 2/2022 | Menon | G02B 26/103 |
| 11,293,459 | B2 * | 4/2022 | Tsui | H01T 19/00 |
| 11,466,674 | B2 * | 10/2022 | Chang | F04B 39/102 |
| 12,193,192 | B2 * | 1/2025 | Ganti | H05K 7/20509 |
| 2006/0268534 | A1 * | 11/2006 | Paydar | H01L 23/467 |
| | | | | 361/814 |
| 2007/0037506 | A1 * | 2/2007 | Lee | F04D 33/00 |
| | | | | 454/184 |
| 2007/0141453 | A1 | 6/2007 | Mahalingam et al. | |
| 2007/0193284 | A1 | 8/2007 | TeGrotenhuis et al. | |
| 2008/0121046 | A1 * | 5/2008 | Glezer | A61F 2/0077 |
| | | | | 73/861.24 |
| 2009/0244180 | A1 | 10/2009 | Panchawagh et al. | |
| 2011/0063800 | A1 * | 3/2011 | Park | F04D 33/00 |
| | | | | 361/697 |
| 2016/0343637 | A1 * | 11/2016 | Axelrod | B81B 7/0093 |
| 2017/0276149 | A1 * | 9/2017 | Dusseau | H01L 23/4336 |
| 2017/0292537 | A1 * | 10/2017 | Barak | F04D 25/06 |
| 2018/0061737 | A1 * | 3/2018 | Arik | F21V 29/60 |
| 2018/0146573 | A1 * | 5/2018 | Chen | H05K 7/20154 |
| 2019/0301442 | A1 * | 10/2019 | Hao | H05K 7/20154 |
| 2020/0053905 | A1 * | 2/2020 | Ganti | F04D 33/00 |
| 2020/0229320 | A1 * | 7/2020 | Mou | A41D 13/002 |
| 2020/0309111 | A1 * | 10/2020 | Mou | F04B 45/047 |
| 2021/0180723 | A1 * | 6/2021 | Mukundan | F04B 19/006 |
| 2021/0183739 | A1 * | 6/2021 | Sathyamurthy | H01L 23/4336 |
| 2022/0120269 | A1 * | 4/2022 | Mou | F16K 15/144 |
| 2022/0282932 | A1 * | 9/2022 | Sathyamurthy | F04D 33/00 |
| 2022/0379235 | A1 * | 12/2022 | Glezer | F25B 39/04 |

OTHER PUBLICATIONS

International Search Report and Written Opinion from Application
No. PCT/US2020/052272 dated Dec. 15, 2020.
Glezer, et al., "Enhanced Convection Heat Transfer Using Small-
Scale Vorticity Concentrations Effected by Flow-Driven Aeroelasti-
cally Vibrating Reeds," Aug. 3, 2016 https://apps.dtic.mil/sti/pdfs/
AD1021521.pdf.

* cited by examiner

Series Configuration

Staggered Configuration

Parallel Configuration

| Source of Minor Loss | Loss Coefficient, K | Baseline Re = 1,000 Pressure Drop (Pa) | 35mm Reed Re = 875 Pressure Drop (Pa) | 52.5mm Reed Re = 850 Pressure Drop (Pa) | 70mm Reed Re = 830 Pressure Drop (Pa) | 105mm Reed Re = 775 Pressure Drop (Pa) | 185mm Reed Re = 765 Pressure Drop (Pa) |
|---|---|---|---|---|---|---|---|
| $K_{up}$ | 0.30 | 13.27 | 10.16 | 9.59 | 9.03 | 7.97 | 7.77 |
| $K_{do}$ | 0.39 | 17.25 | 13.21 | 12.46 | 11.74 | 10.36 | 10.10 |
| $K_{dj}$ | 1.75 | 4.63 | 3.54 | 3.34 | 3.15 | 2.78 | 2.71 |
| $K_o$ | 8.26 | 21.82 | 16.71 | 15.76 | 14.85 | 13.11 | 12.77 |
| $K_{si} + K_e$ | 8.55 | 61.58 | 47.15 | 44.49 | 41.91 | 36.99 | 36.04 |
| $\Delta T$ | N/A | -3.79 | -3.79 | -3.79 | -3.79 | -3.79 | -3.79 |
| Minor Loss Total | | 114.76 | 86.97 | 81.85 | 76.90 | 67.41 | 65.59 |
| Loss Through Heat Sink | | 31.97 | 41.44 | 46.61 | 49.77 | 54.12 | 65.60 |
| Total Pressure Drop | | 146.73 | 128.41 | 128.46 | 126.67 | 121.53 | 131.19 |

FIG. 21

|  | Re | $h$ (W/m²K) | $\Delta h$ with Reed | Power Dissipated (W) |
|---|---|---|---|---|
| Baseline | 775 | 45.08 |  | 27.1 |
|  | 850 | 45.28 |  | 27.3 |
|  | 1000 | 47.33 |  | 27.1 |
| Reed | 775 | 56.18 | 24.6% | 27.4 |
|  | 850 | 58.99 | 30.3% | 27.3 |
|  | 1000 | 62.16 | 31.3% | 27.2 |

FIG. 22

REED-TYPE THERMAL TECHNOLOGIES

CROSS-REFERENCE TO RELATED APPLICATIONS

This application claims the benefit of U.S. Provisional Patent Application No. 62/904,314 filed 23 Sep. 2019, the entire contents and substance of which are hereby incorporated by reference as if fully set forth below.

STATEMENT REGARDING FEDERALLY SPONSORED RESEARCH OR DEVELOPMENT

This invention was made with government support under grant numbers FA9550-13-1-0053 awarded by the Department of Defense and CBET-1357813 awarded by the National Science Foundation. The government has certain rights in the invention.

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The various exemplary embodiments of the disclosure relate generally to heat transfer processes, methods, and systems. It is particularly related to self-oscillating reed systems and methods.

2. Background

Heating, ventilation, and cooling (HVAC) systems depend on ducts or conduits to provide the necessary amount of heating and cooling to the occupants of any building or home. These conduits enable the proper and efficient circulation of air that has been heated or cooled to the right temperature by the furnace or the air-conditioning unit.

HVAC systems used in large scale commercial buildings use many different components to ensure that building occupants have a comfortable environment to perform their daily activities.

During summer, the use of air conditioners using an air-cooled condenser (ACC) is critical to maintaining a temperature that is lower than that outside the building. Condensers work by taking in warmer air and cooling it down by various means such as a refrigerant. As the temperature of the incoming air that requires to be cooled prior to circulation within the facility rises, the condenser has to work hard to perform the transfer of heat from the incoming air.

Many technologies are utilized to achieve this heat transfer. Air-cooled and water-cooled are the most common and are utilized for small- and medium-large scale facilities based on the need and the environment.

Heat transfer in ACC units leverage different kinds of sinks to enhance and optimize the performance of the overall system and achieve the right temperature differential quickly between the heated air and the cooled air entering and exiting the system respectively. Structures such as channels that allow for forced convection heat sinks are frequently used in ACC systems to achieve the desired effects. They are able to effectively transfer and release the heat that is present in the air and help to cool it down faster—thus improving overall efficiency and lower operating costs.

In the chemical and processing industries (CPI) and refrigeration and air-conditioning industry, typical heat transfer enhancement techniques adopted over the years include surface modification of heat exchanger tubes (e.g., knurling, rifling, and spiral grooves) that retain overall tube and bundle geometry. While these techniques enhance transport, their ranges of applicability can be quite limited, and associated pressure drop penalties can be significant. Mechanical techniques such as stirring, scraping, and tumbling are applied to situations with very viscous, often non-Newtonian fluids and slurries, with their own shortcomings due to the need for electrical power and agitation.

On the air-side, which often can benefit the most from enhancement, pressure drop penalties from surface dimpling, or use of vortex generators or louvered or wavy fins, can largely negate benefits of heat transfer enhancement. Most importantly, implementation details play an important role in determining actual performance. Almost all literature on air-side enhancement assumes uniformly distributed, perpendicularly oriented air flow across the heat exchanger face. However, due to the installation of air-cooled heat exchangers and the forced- or induced-draft fans used to drive air flow, the flow is almost never perpendicular to the heat exchanger face, and is almost always severely maldistributed, starving large portions of the heat exchanger of any appreciable air flow.

Thermal management is a major challenge over a broad scale of air-cooling devices, from large-scales such as heat exchangers used in ACCs to small-scales such as heat sinks used in electronics cooling. Forced convection heat transfer within the high aspect-ratio channels of these devices is typically limited by the available air volume flow rate or an inherently low channel Reynolds number (Re).

Conventional techniques to enhance the heat transfer include increasing the air flow rate or Re and passive channel surface modifications such as rib turbulators longitudinal vortex. However, the heat transfer enhancement is accompanied by an even higher increment in channel flow losses.

Forced convection heat transfer in compact high-power air-cooled heat sinks with high density, high aspect ratio fin channels are typically limited by the air volume flow rate or an inherently low channel Reynolds number. Therefore, heat transport is restricted by the coupled local heat transfer from the fin surfaces within the thermal boundary layers and by insufficient mixing with the core flow. While these limitations are commonly overcome by increased air volume flow rate and/or the fin area and density albeit with significant penalty in losses, they can also be overcome by inducing small-scale fluid motions within the base channel flow.

The presence of such small-scale motions contributes simultaneously to enhanced heat transfer at the fin surface and heat transport by mixing of the boundary layers with the core flow. The effectiveness of this approach especially at low Reynolds numbers that are characteristic of air-cooling applications, was first demonstrated using synthetic jet actuators (e.g., by direct impingement, or by integration with heat sinks). Unsteady, small-scale motions were also used for external cooling of low-power electronic packages by using oscillating jet-like flows produced by piezoelectric "fans."

Enhanced cooling by induced small-scale motions has been incrementally advanced, including the use of active enhancement of heat transfer within high aspect ratio rectangular channels to model the flow within heat sink channels using cantilevered planar piezoelectrically-driven oscillating reeds mounted along the channel's span and driven at resonance. The presence of the active reeds led to a significant decrease in the fin-to-air heat transfer resistance and can lead to a 2.4-fold increase in the coefficient of performance (COP) over the base flow.

Channel heat transfer can also be augmented by exploiting the coupling between the flow and a rigid or flexible autonomous cantilever reed to effect cross stream oscillations. Thin copper plates (flags) have been used for heat transfer enhancement in water tube; however, the rigidity of the flags limited their oscillations to $20,000<Re<50,000$. Using a similar approach, miniature brass plates have been used spanning the width of an air channel between two parallel plates as vortex generators for $9,000<Re<40,000$ and reported significant local heat transfer enhancements with marginal flow losses. It is evident that the rigidity of the metal plates used in these investigations limits their utility to relatively high flow speeds and sets a low bound on the useful range of Reynolds number.

A need exists for the understanding and characterization of the relationship between small-scale motions induced by a flexible reed and the corresponding heat transfer enhancement and flow losses.

BRIEF SUMMARY OF THE DISCLOSURE

Low Reynolds number forced convection heat transport within the fin channels of ACCs are enhanced by deliberate formation of unsteady, small-scale vortical motions using aero-elastically fluttering thin-film reeds that span the channel height. These vortical motions substantially increase the local heat transfer coefficient at the channel walls and mixing between the wall thermal boundary layers and the cooler core flow.

The flow mechanisms associated with production, advection and dissipation of these small-scale motions are investigated in a modular, high aspect ratio channel using micro-PIV, video imaging of the reed motion, and hot-wire anemometry. The global heat transfer enhancement is investigated in a modular heat sink prototype using temperature and pressure measurements.

It is shown that the reed-induced small scale motions increase the turbulent kinetic energy of the flow even when the base flow undergoes transition to turbulence, leading to an increase in the local and global Nusselt number (Nu) that is sustained at higher Re and a minor relative increase in losses. While these losses depend primarily on the reed's oscillation Strouhal number (St) which is determined by the reed's mass ratio (M*) and structural rigidity (U*), because the global Nu depends only weakly on St, the losses associated with the presence of the reed can be strongly mitigated by reducing its St while maintaining the heat transfer enhancement.

An innovative method for enhancement of heat transfer from heated surfaces is disclosed using passive and/or active, self-oscillating reeds (SORs) that are driven by the media flow. In many instances, the media flow is air. But the invention contemplates heat transfer benefits with media other than air, including other gases, liquids, and mixtures thereof.

The vibration of the reeds in the media flow (that is typically driven by the system fan) leads to the formation of small-scale flow motions that significantly enhance heat transfer from the heated surfaces and mixes the heated media with the cooler core flow. The reeds can be inserted within both closed- and open-heated channels and can be manufactured using several bulk fabrication technologies.

The present auto-fluttering reed technology introduces vortical structures into air-side flows, by enhancing flow in regions where it is otherwise relatively ineffective. The approach, using arrays of reeds undergoing flow-induced vibration driven by the underlying mean flow, enhances heat transfer over Reynolds number ranges of interest to a variety of CPI applications. No external energy input is required, and there is no significant pressure drop penalty, unlike other air-side enhancement approaches.

Experiments on individual reeds, as well as scaled-down condensers operating at conditions representative of power-plant condensers, have shown that the enhancement is such that initial (inlet) temperature differences between the tube and air sides can be reduced by as much as a factor of two. The associated pumping power increase was found to be minimal compared to the overall power required to deliver air flow to these condensers (with a COP increase of 100-200%).

The present invention has been through detailed design and optimization exercises on actual 500 MW power plants and has demonstrated heat transfer enhancement sufficient to improve overall plant efficiency by ~1.5%. This revolutionary technological advance, which brings the performance of ACCs close to that of conventional wet-cooled condensers, can be applied to CPI-type heat exchangers, yielding substantial improvements in performance and reductions in size. The achievable enhancement will be further improved by mitigation of media flow maldistribution across the heat exchangers surfaces.

The present invention further comprises the optimization of heat transfer enhancement by modifying the reed planform area, operating frequency, mounting location along the length of the channel and micro-patterning on its surface.

A pneumatically assisted front-end reed mounting design is also disclosed that can enable rapid assembly of reed arrays in heat exchangers of ACCs.

The present invention includes a method for the enhancement of heat transfer and cooling performance in air-cooled heated ducts using passive and/or active, SORs that are driven by the air flow. The vibration of the reeds in the air flow (that is typically driven by the system fan) leads to the formation of small-scale flow motions that significantly enhance heat transfer from the heated surfaces and mixes the heated air with the cooler core flow. The reeds can be inserted within both closed- and open-heated channels and can be manufactured using several bulk fabrication technologies.

In the present application, the vibration of the reed is forced by media motion on both sides of the reed. When the interaction between the reed motion and the flow which is accompanied by regular shedding of vortices, exceeds a certain threshold, the large reed displacement can be attained which, in turn intensifies the strength of the shed vortices. These shed vortices lead to significant enhancement of the heat transfer in the channel by disrupting the thermal boundary layers and enhancing mixing with the cooler core flow.

The present invention provides significant enhancement of heat transfer in air cooled conduits and reduction of power required to drive flow within the system leading to remarkable improvement in performance (e.g., in ACCs, COP enhancements exceeding 120% have been observed over conventional techniques such as dimples and vortex generators).

In an exemplary embodiment, the present invention is a process of low Reynolds number heat transport between flowing media within a channel by deliberate formation of unsteady vortical motions in the flowing media. The media can be air, another gas, a liquid, and mixtures thereof.

The deliberate formation of unsteady vortical motions in the flowing media can comprise locating a reed within the path of the flowing media. The reed can comprise an aero-elastically thin-film reed.

The channel has a channel height, and the reed can be designed to span the channel height.

The invention can include more than one reed. Where the deliberate formation of unsteady vortical motions in the flowing media comprises locating a number of reeds, each oscillating at a reed frequency (which can be different one from another, be different one from another, or some can have the same frequency), and at least some spanning the channel height within the path of the flowing media.

A specific reed frequency is dependent upon reed geometry, reed make-up, and characteristics of the system of media flow, channel geometry/aspect ratio and other features.

The one or more reeds can be fabricated and located in such a way that its reed frequency is solely dependent on how it is located in the channel, and what flows through the flow path. In this way, it can be considered a passive reed.

The one or more reeds can be fabricated and located in such a way that its reed frequency is at least partially dependent on an outside control, like a mechanical actuator that dampens the otherwise "passive" reed frequency, or via the implementation electrostatic interactions between the thin-film reeds and fin-channel walls which are actively managed. In this way, it can be considered an active reed.

Thus, the reed can be a passively oscillating reed oscillating at a frequency dependent upon characteristics of the flowing media, channel geometry and the reed's structural and geometrical properties.

The reed can be an actuated oscillating reed oscillating at a frequency at least partially dependent upon an actuating force, and characteristics of the flowing media, channel geometry and the reed's structural and geometrical properties.

It is possible that any one or more reeds is both passive and active, in that its frequency can be controlled by an outside mechanism, but because of circumstance, an otherwise active reed is left to "act" as a passive reed. This does not alter that a reed can be left to oscillate as dictated by flow and system characteristics, even if it is wired, connected or otherwise capable of being controlled by an intelligent control.

Both changes in heat transport and changes in channel flow losses are related to the reed frequency. Surprisingly, an intelligently controlled reduction in reed frequency nonetheless increases the overall thermal performance of the process. The intelligently controlled reduction in reed frequency can be such that it decreases channel flow losses in an amount greater than the decrease in heat transport, thus increasing the overall thermal performance of the process.

The single reed or one or more of them in a set of reeds can be positioned (fully) within the channel. Or, at least a portion of a reed can be positioned upstream an inlet of the channel, in a way that a reed is located both inside and outside the channel. In other embodiments, one or more reeds can be fully outside a channel, being in the flow path but not within a channel.

The outer surfaces of the reed can be substantially uniformly smooth. At least a portion of the outer surfaces of the reed can comprise microstructures.

In another exemplary embodiment, the present invention can be a process of low Reynolds number heat transport between flowing media comprising providing a flow path for the flowing media, wherein at least a portion of the flow path comprises a channel into which the flowing media flows into an inlet of the channel, and deliberately forming unsteady vortical motions in the flowing media, wherein deliberately forming unsteady vortical motions in the flowing media comprises locating a number of aero-elastically thin-film reeds in the flow path, wherein at least a portion of at least one reed is positioned upstream the inlet of the channel, the remaining portion being within the channel.

The reeds oscillate at reed frequencies that correlate with an intensity of the unsteady vortical motions deliberately formed by one or more of the reeds. Each reed may have its own reed frequency when subject to the same environment as another reed, due to differences between the reeds.

As discussed above, reducing reed frequencies surprisingly increases the overall thermal performance of the process.

The flow path can be contained in a heat transfer system that is separate from the aero-elastically thin-film reeds, which themselves are housed within a reed array unit that is separable from the heat transfer system.

The invention can further comprise mounting the reed array unit into the heat transfer system prior to deliberately forming unsteady vortical motions in the flowing media. The mounting comprises pneumatically assisted mounting.

In another exemplary embodiment, the present invention can comprise a process of low Reynolds number heat transport between flowing media comprising providing flow paths for the flowing media, wherein a portion of at least one of the flow paths comprises a channel into which the flowing media flows into an inlet of the channel, and deliberately forming unsteady vortical motions in the flowing media, wherein deliberately forming unsteady vortical motions in the flowing media comprises locating thin-film reeds, at least some of which oscillate at a frequency when the flowing media is flowing, wherein at least a portion of at least one reed is positioned upstream the inlet of the channel, the remaining portion being within the channel, wherein at least a portion of the reeds are passively oscillating reeds oscillating at frequencies dependent upon characteristics of the flowing media, channel geometry and reed structural and geometrical properties, wherein at least a portion of the reeds are actuated oscillating reeds oscillating at a frequency at least partially dependent upon an actuating force, and characteristics of the flowing media, channel geometry and reed structural and geometrical properties, and wherein at least a portion of the outer surfaces of at least a portion of the reeds comprises microstructures.

Reducing reed frequencies of at least a portion of the actuated oscillating reeds increases the overall thermal performance of the process.

The flow paths can be contained in a heat transfer system, and the reeds housed within a reed array unit that is separable from the heat transfer system.

The process can further comprise mounting the reed array unit into the heat transfer system prior to deliberately forming unsteady vortical motions in the flowing media. The mounting can comprise pneumatically assisted mounting.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

FIG. 14 shows the Performance parameter, $\Delta\dot{Q}/\Delta\dot{W}$, for secondary base flow, T-shape reed, and rectangular reed.

FIGS. 18A, 8 are schematic views (perspective and end) of a double-sided heat sink used to perform constant heat flux measurements.

FIG. 21 is a Table providing a comparison of flow associated losses in an ACC for the different reed lengths tested for their respective operating Re.

FIG. 22 is a Table providing heat transfer studies performed for the optimum reed length (L=105 mm) and comparison with the base flow at different Re.

DETAILED DESCRIPTION OF THE DISCLOSURE

Figure 1:
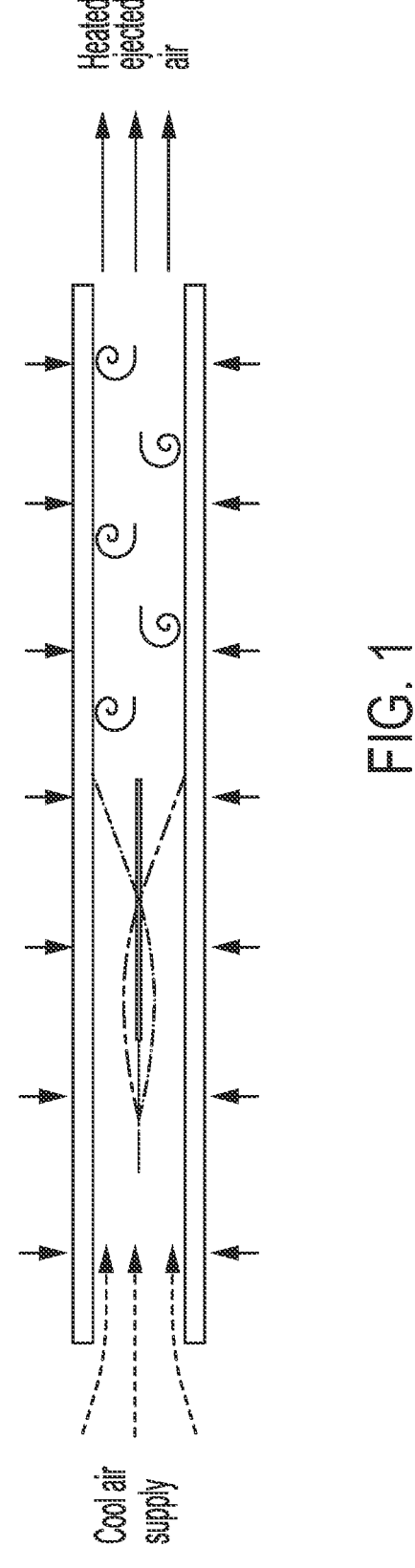
FIG. 1 is a schematic of an operational mode of a self-oscillating reed (SOR) in a heated channel.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present invention includes new techniques that significantly enhance the ability to transfer heat from the air flowing in the ducts and increasing cooling effectiveness of ACCs has been developed. It is especially useful for large scale buildings where heat/cold transfer technology is critical in the optimization of the HVAC system performance—especially during times when the weather reaches local and temporal extremes.

The intelligent use of passive and/or active, SORs is demonstrated to achieve an improved transfer of thermal energy out of the air circulating through the building and quickly achieve the right temperature inside the building particularly during hot summer days. Testing of this technique and variations of it have demonstrated very effective heat transfer that takes advantage of the small-scale flow motions, i.e., vortices—that occur and assist in making the desired temperature changes of the air flowing through the ducts.

In an exemplary embodiment, the present invention can be easily and quickly integrated into different types of channeling mechanisms present in current HVAC system designs and installations, including close- and open-hearted channels. The reeds are designed to be cantilevered such that the bulk airflow through the duct creates a coupling interaction that results in a higher level of energy transfer from the core to the flowing air. The design leverages the phenomenon of vortices that are generated when air flows over surfaces above certain speeds. These vortices tend to be created and shed, and the approach takes advantage of the shedding of vortices to achieve enhanced heat transfer out of the flowing air—thus cooling it down. The strengthening of these vortices which occurs when a certain threshold of interaction between the reed and the airflow occurs—further improves the heat transfer mechanism through disruption of thermal boundary layers resulting in hot and cooler core airflows mixing and causing the right air temperature to be achieved much more rapidly.

The invention also incorporates many practical elements such as the ability to retroactively and easily replace other less effective techniques such as dimples without requiring significant structural modifications of the overall HVAC system. Additionally, design variations such as pneumatically assisted reed mounting modules and various reed shapes and structures have been developed to allow for rapid and precise mounting, assembly and disassembly of these reed arrays in ACC-types of HVAC equipment.

Exemplary embodiments of the present invention comprise innovative self-oscillating, cantilevered reeds that operate by coupling to, interacting with, and extracting mechanical energy from the bulk air flow. As shown in FIG.

1, the oscillation frequency is determined by several geometrical and material properties of the reed's blade.

Vibrating reeds are commonly used in wind instruments such as clarinets, oboes, saxophones, etc. Sound is produced by the reed motion which is induced by the air flow over its surface and regulated by pressure applied by the lips. The bore of the instrument is a resonator that amplifies the sound. For example, a clarinet reed vibrates at frequencies that are below its natural frequency.

In several studies of reeds in wood wind instruments, the reed oscillations were modeled as a damped harmonic oscillator driven by sinusoidal forcing. This model has been adopted by numerous studies. The general equation of a damped harmonic oscillator with a driving force input is:

$$m\ddot{y} + c\dot{y} + ky = F_0 \cos \omega t \qquad (1)$$

where m is the mass, c is the damping coefficient and k the spring constant. The equation of motion of the reed can be modeled as the forced bending vibrations of a plate in the streamwise direction caused by a pressure difference between the two sides of the reed:

$$\rho_r \frac{\partial^2 y}{\partial t^2} + D \frac{\partial^4 y}{\partial x^4} = \Delta \overline{P} \qquad (2)$$

where $\rho_r$ is the density of the reed, D is the flexural rigidity $$D = \frac{E t_r^3}{12(1 - v^2)},$$

where E is the modulus of elasticity of the reed material, $t_r$ is the reed thickness, v is Poisson's ratio, and $\Delta \overline{P}$ is the pressure difference between the two sides of the reed averaged in the spanwise direction.

Figure 2:
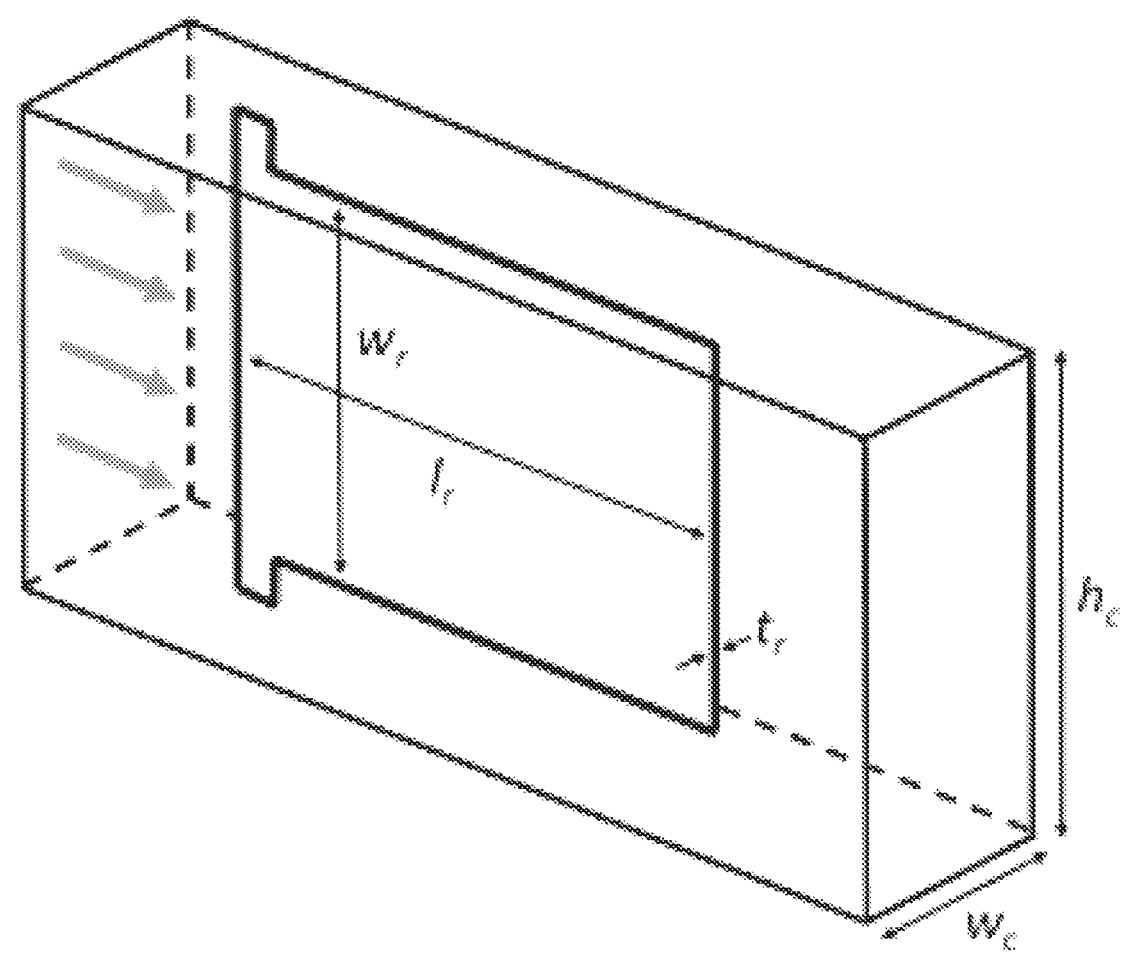
FIG. 2 is a schematic of channel and reed dimensions schematic.

Dimensional analysis of the flow about a reed within a channel (FIG. 2) shows that the reed vibration frequency depends on:

$$St = F(M, U, W, AR, \text{Re}) \qquad (3)$$

Where $$St = \frac{f l_r}{V}$$

is the Strouhal number (where f is the vibration frequency, $l_r$ is the length of the reed, and V is the average flow speed within the duct), $$M = \frac{\rho_f l_r}{\rho_r t_r}$$

is the mass ratio (where $\rho_f$ is the density of the fluid), $$U = V \sqrt{\frac{\rho_f w_r l_r}{D}}$$

is the ratio of the fluid kinetic energy to the elastic potential energy of the reed ($w_r$ is the width of the reed), $$W = \frac{w_r}{l_r}$$

is the aspect ratio of the reed, $$AR = \frac{w_c}{h_c}$$

is the aspect ratio of the channel (where $w_c$ and $h_c$ are the width and height of the channel respectively) and $$Re = \frac{V D_h}{v_f}$$

is the Reynolds number based on the hydraulic diameter of the channel $D_h$ ($v_f$ is the kinematic viscosity of the fluid).

Figure 3A:
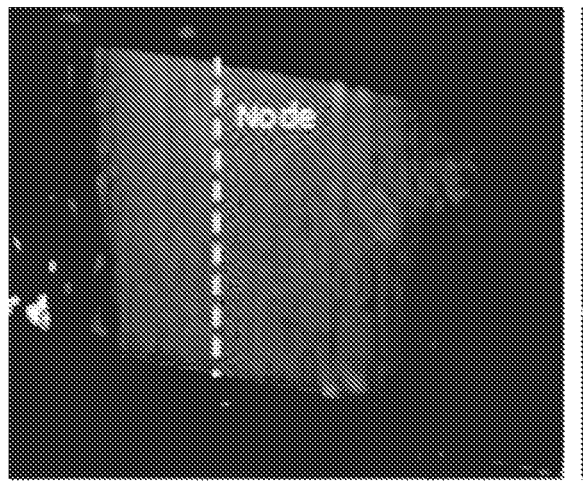
FIGS. 3A, 3B are snapshots of high-speed video (FIG. 3A) and finite element method (FEM) models of same (FIG. 3B).
Figure 3A:
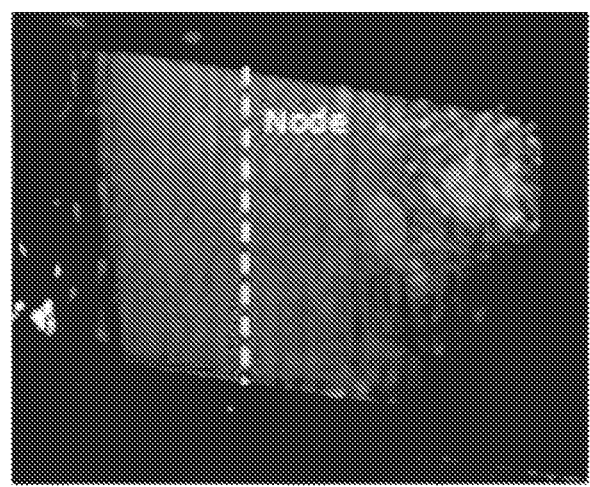
Figure 3B:
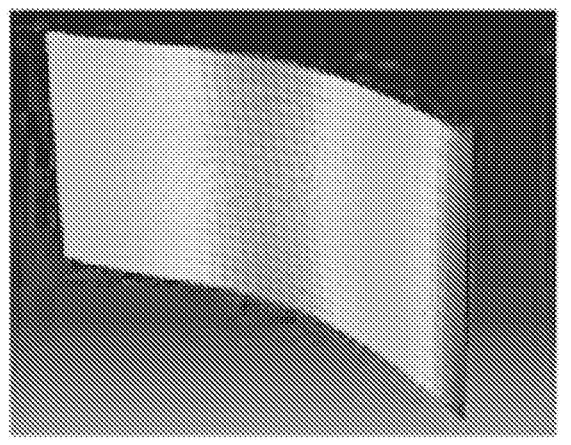
Figure 3B:
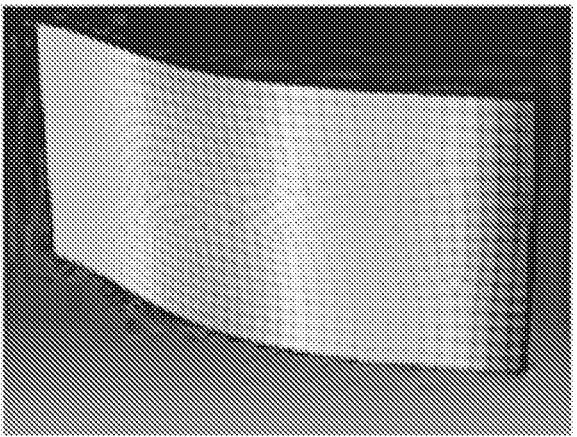

Observation of different frames of a high-speed video captured, shows that the mode shape of the vibration has one node. By comparing these images with a static FEM done in Abaqus, shows that the reed could be vibrating in a regime near its third mode of resonance. As it can be observed in FIGS. 3A, 3B, the mode shape of the video images is very similar to the FEM, and the FEM shows a resonance frequency of 237 Hz for the 0.002" reed, of 359 Hz for the 0.003" reed and of 475 Hz for the 0.004" reed. These structural resonance frequencies are 11%, 5% and 2% smaller respectively than the onset of the vibration frequencies measured. Therefore, it can be speculated that the reeds are operating at a frequency higher than the third mode of resonance. A self-oscillating reed of particular geometrical characteristics can be selected for different flow rates to yield oscillations and low losses characterized by the pressure drop in the channel ($\Delta P$).

Figures 4A, 4B, 4C:
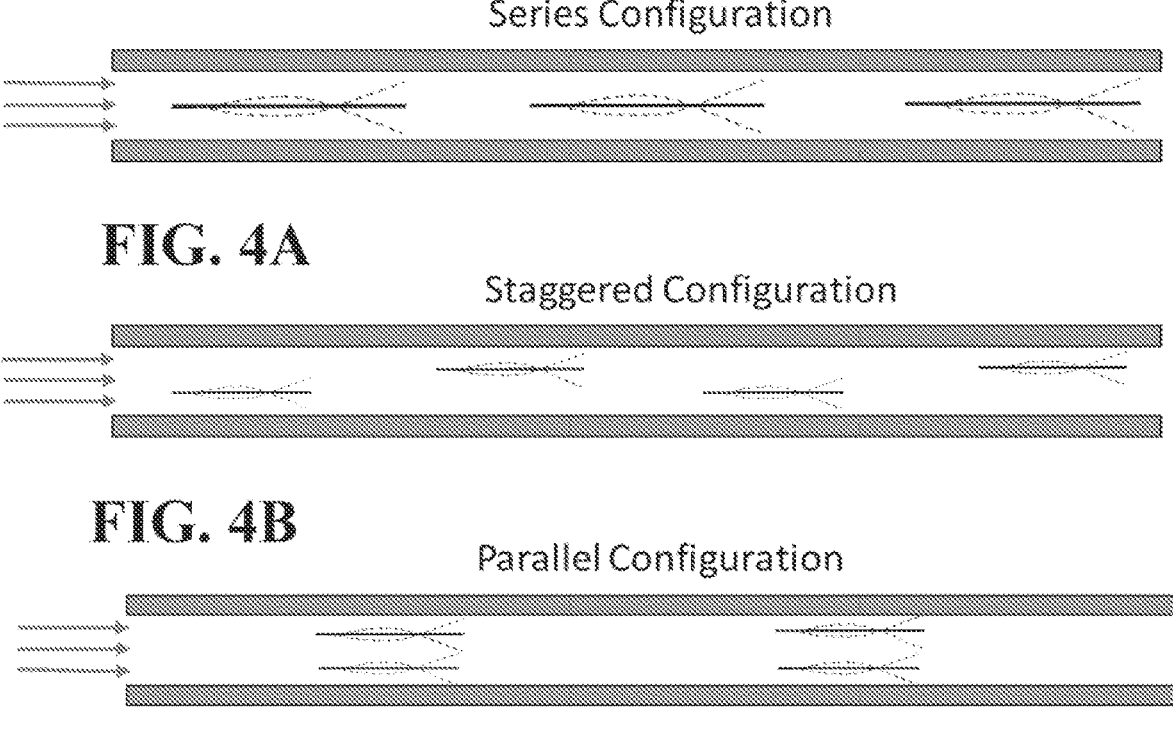
FIGS. 4A-4C illustrate reed configurations for heat transfer enhancement, including in a series configuration (FIG. 4A), a staggered configuration (FIG. 4B), and a parallel configuration (FIG. 4C).

Multiple configurations of reeds within a given channel can be contemplated. reeds can be located in-line along the channel (FIG. 4A), in a staggered configuration (FIG. 4B) or in parallel and in multiple stream-wise locations (FIG. 4C). Active cooling of the fins has been experimentally demonstrated in a high-aspect-ratio heat transfer channel using such devices.

Self-oscillating reeds (SORs) can be fabricated over a broad range of scales using advanced, batch micro fabrication approaches. The reed design consists of a flag made out of polymer material (or metal) using laser micromachining. MEMS technologies have the potential to fabricate these structures at low cost using a mass manufacturing approach. Further, additional features can also be fabricated. Such features can enhance the displacement, decrease the pressure drop across the reed, and even tune the reed behavior to a specific flow regime.

Figure 5A:
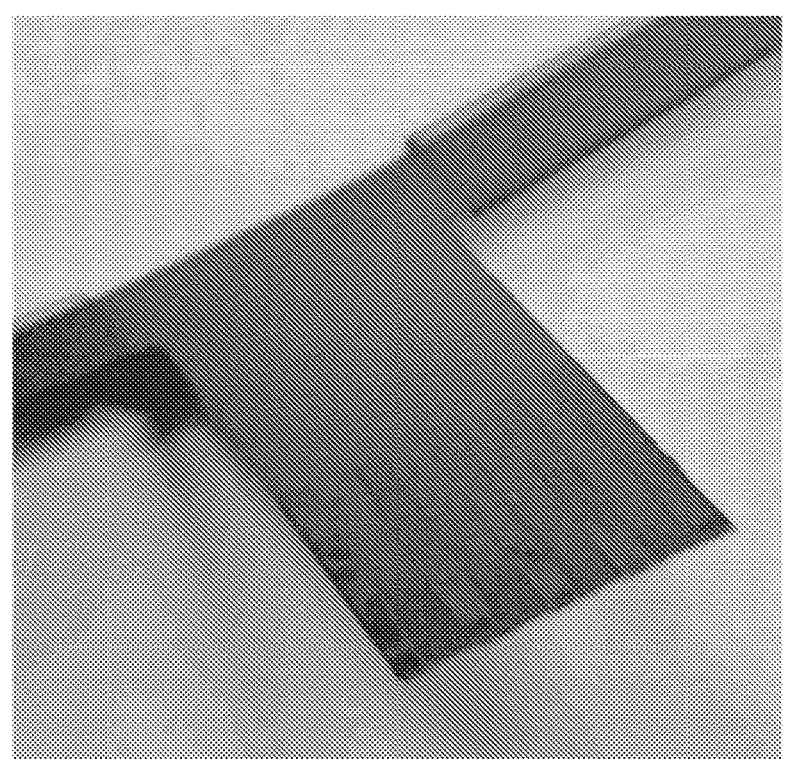
FIGS. 5A, 5B include an image of an advanced self-oscillating reed with corrugations (FIG. 5A), and a cross-sectional rendering of the corrugations (FIG. 5B).
Figure 5B:
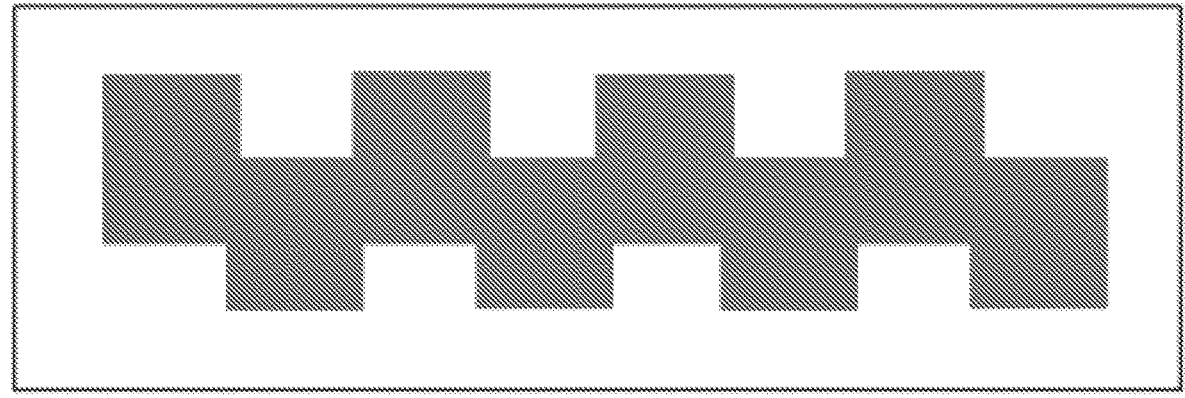

FIGS. 5A, 5B include a picture of a microfabricated polymer-based self-oscillating reed with corrugations. The corrugations prevent from wall suction phenomenon, which was observed with standard (i.e., non-corrugated) SORs. This device was fabricated by laminating pre-patterned sheets of polymer materials. Other compatible processes such as embossing and/or molding techniques can be considered for micro-structuring of polymer or metal SORs. The self-oscillating reed technology can be scaled up and scaled down depending on the applications as the reed oscillation should be tuned to operate under appropriate conditions by tailoring the dimensions and film properties of the reed.

An investigation was conducted in a modular, rectangular channel test section measuring 2.5×10×186 mm. This section is preceded by a 260 mm long settling section having the same internal dimensions, and an upstream contraction (contraction ratio of 28) to ensure fully developed, span-wise-uniform flow. The contraction is driven by a regulated air supply monitored by a precision flow meter (the flow rate is measured to within 1.5%). The settling section is instrumented with multiple pressure ports along and around the flow channel to measure the flow uniformity prior to entering the test section. There are two interchangeable test sections, one for static pressure measurements and another for heat transfer measurements.

Figure 6:
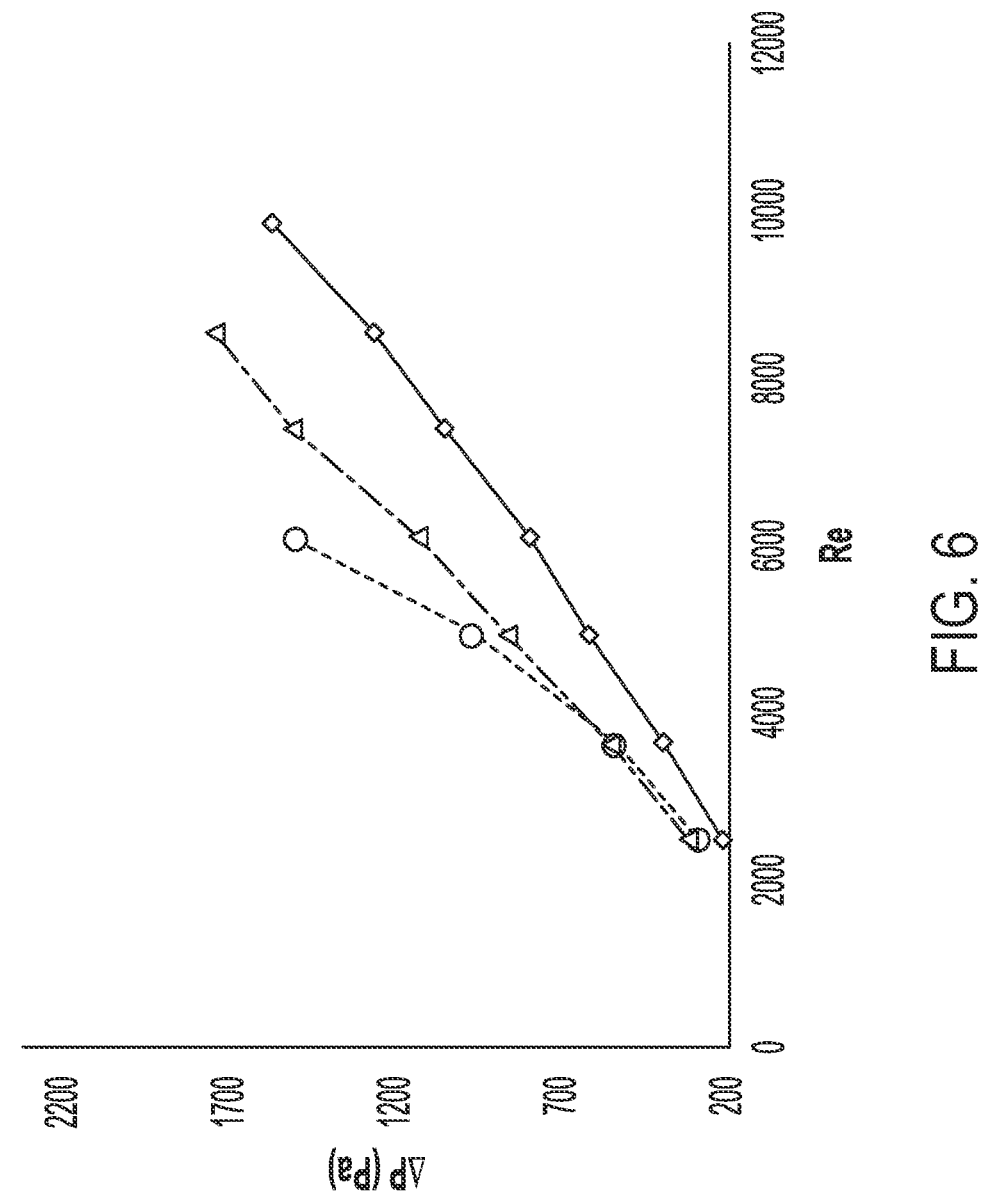
FIG. 6 is a graph of pressure drop for different SOR's.

Pressure drop measurements were performed in a test channel measuring 2.5×10×186 mm Static pressure measurements within the test and settling sections were obtained using pressure transducer with a resolution of 0.25% of the full scale coupled with a 48-port pressure switch. The baseline pressure drop of the channel without reeds is plotted in FIG. 6, which shows the total pressure drop as a function of the Reynolds number. As presented, the corrugated reed exhibits lower pressure drop compared to a non-corrugated reed, indicated that micro-structuring can improve device performance.

Figure 7:
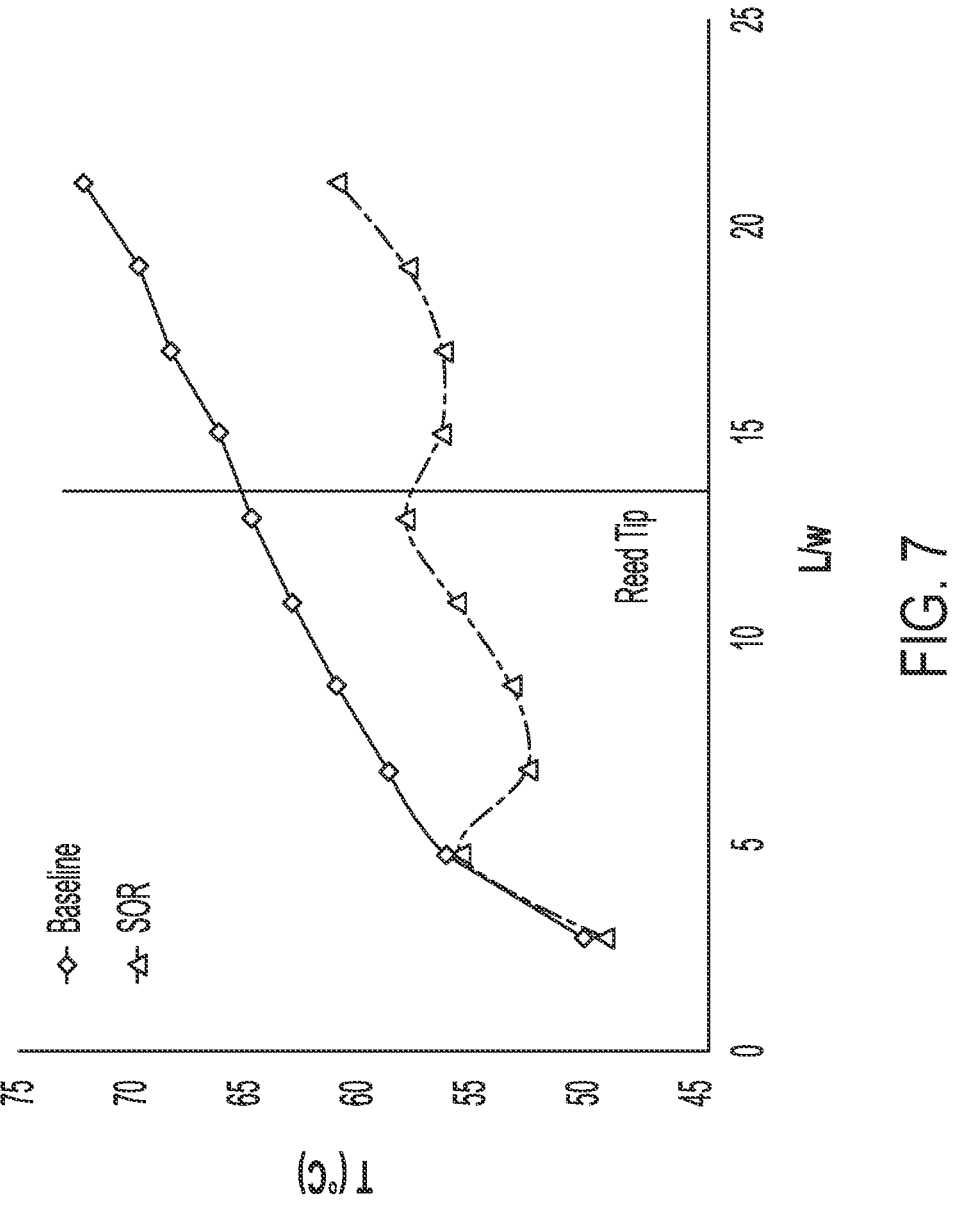
FIG. 7 is a graph of baseline and SOR enhanced wall temperatures.

An investigation was conducted in a modular channel test section measuring 2.5×10×62 mm. The heat transfer test section includes removable sidewalls that are integrated with heaters for thermal measurements. The heaters on each of the side walls are comprised of microfabricated spanwise copper serpentine trace (having characteristic resistance of 60Ω that is deposited on a glass substrate. Each heater element is controlled using a high precision current source allowing resolution of the power dissipation to within 20 mW. Individual spanwise windings of the serpentine heater are tapped for (spanwise-averaged) temperature measurements with resolution that is better than $0.1°$ C. by exploiting the Joule heating of the copper windings. FIG. 7 shows the effect in the wall temperature of the oscillations of the SOR. Both the wall temperature distribution along the baseline channel and the SOR enhanced channel is plotted. The small-scale motions induced by the reed show a better mixing of the thermal boundary layer with the cold core flow, and consequently a decrease in the wall temperature upon actuation. Such decrease in the wall temperature, occurs mostly downstream of the tip of the reed but there is also an effect upstream of the reed tip due to the complex vibration mode of the SOR.

Figure 8:
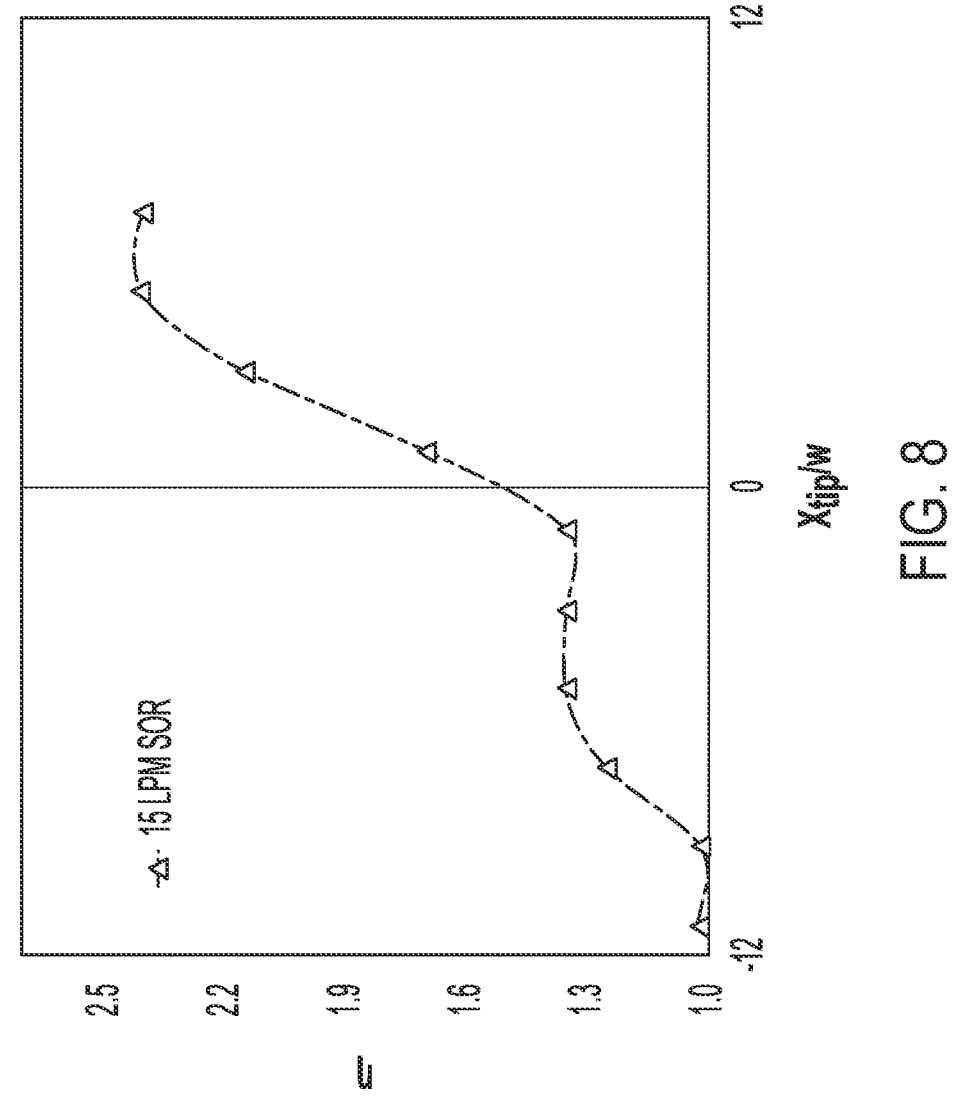
FIG. 8 is a graph of local Nusselt Number enhancement.

FIG. 8 shows the local Nusselt number enhancement η, which is the ratio of the SOR enhanced Nusselt number to the baseline Nusselt number ($\eta = Nu_{SOR}/Nu_{baseline}$). Results show an increase in local Nusselt number (and therefore heat transfer coefficient) of 2.4 times compared to the baseline channel.

The reed motion enhances mixing in the channel flows which is used to significantly increase the heat transfer from the channel walls, characterized through the temperature and the velocity flux measurements at the exit of the channel with the measurements of temperatures along the length of the channel wall. These measurements were used to calculate the total power dissipated to air ($\dot{Q} = \dot{m} C_p (T_{m,e} - T_{m,i})$, where $T_{m,e}$ and $T_{m,i}$ are the measured bulk mean temperatures at the inlet and exit of the channel, rh is the mass flow rate in the channel and $C_p$ is the specific heat capacity of air) in the presence and the absence of the reed (baseline). Polyester reeds (30 and 50 mm long) were tested for a range of Re.

Figure 9:
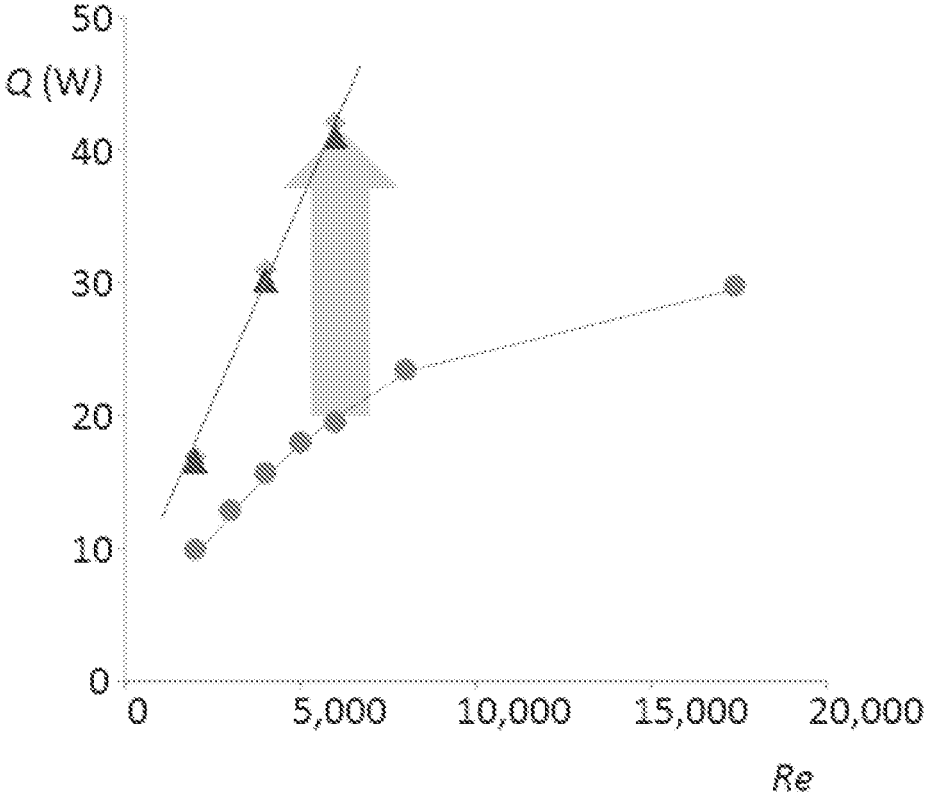
FIG. 9 is a graph of the variation of power removed by air with Re in the absence of reeds (●) and presence of the reeds (reed length, L=30 mm (▲), L=50 mm (♦)).

For a given length of the reed and operating Re, the thickness of the reed was determined such that the operating Re is also the critical Re of the reed. Thus, the heat transfer data is representative of the transitional thermal characteristics of the channel in presence of the reed. FIG. 9 shows the variation of the power removed by air, $\dot{Q}$, with Reynolds number Re=$uD_h/v$, where u is the mean velocity of the air, $D_h$ is the hydraulic diameter of the channel and v is the kinematic viscosity of air) in a 5×25 mm channel. For the base flow, $\dot{Q}$ increases linearly with Re (up to Re~6,000) and as then saturates as Re is further increased. For both long and short reeds, $\dot{Q}$ increases with Re linearly for all the values of Re tested. The introduction of reed leads to approximately 67% increment in $\dot{Q}$ at Re=2,000 as compared to the base flow. This enhancement increases with the increase in Re to 200% at Re=6,000 as shown in FIG. 9, where the curves for power removed by the base flow and the reeds diverge from each other as Re increases.

Figure 10:
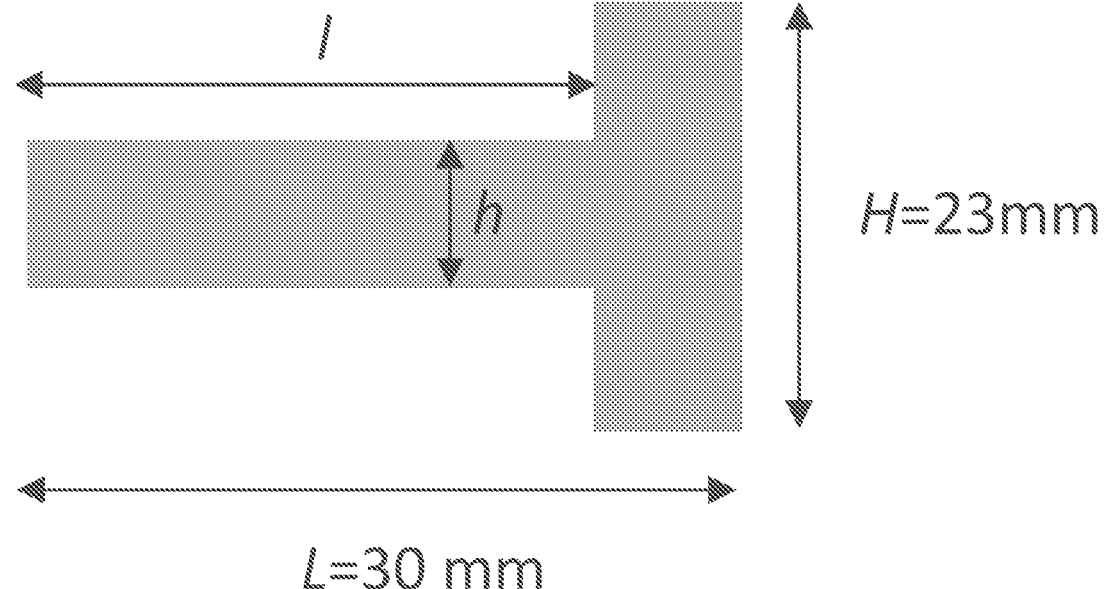
FIG. 10 is a schematic of a T-shape reed.
Figure 11:
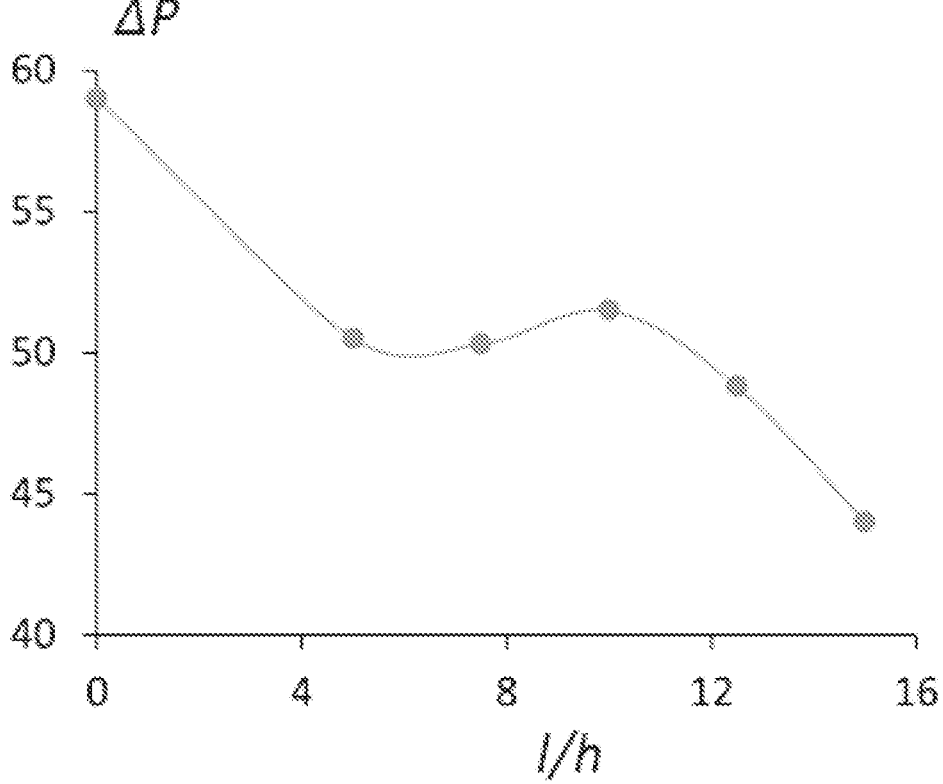
FIGS. 11-14 illustrate variation of pressure drop in the channel (FIG. 11), power dissipated to air, $\dot{Q}(W)$ (FIG. 12), COP as a function of neck aspect ratio (L/H) of the reeds (FIG. 13)

While maintaining the flow rate in the channel, the rectangular planform of the reed was modified and its effect on the power removed by the air, $\dot{Q}$, and overall pressure drop in the channel, ΔP was measured with the intent to characterize the COP enhancement in the presence of a reed. FIG. 10 schematically shows a T-shape reed. The length (l) and the height of the neck (h) of the T-shape reed can be varied to change the planform of the reed while keeping the global dimensions L (=30 mm) and H (=23 mm) constant. The case corresponding to l=0 represents a rectangular reed and h=0 represents base flow. FIG. 11 shows the variation of overall pressure drop, ΔP, with the neck aspect ratio, L/H. L/H=0 represents a rectangular reed for which the contact surface area with the flow is the highest and hence the highest pressure drop. With the increase in L/H, reed transforms to a "T-shape" and the pressure drop decreases because of reduction in reed contact surface area. The linear decrease is evident up to L/H=5. The pressure drop remains approximately invariant from L/H=5 to 10. This can be attributed to a balance between decreasing reed contact surface area with the flow and change in reed operating mode due to smaller reed inertia and planform shape. From L/H=10 to 15, a monotonic decrease in pressure drop can be observed, which can be attributed to stabilization of reed operating mode and consistent decrease in reed contact area with the flow.

Figure 12:
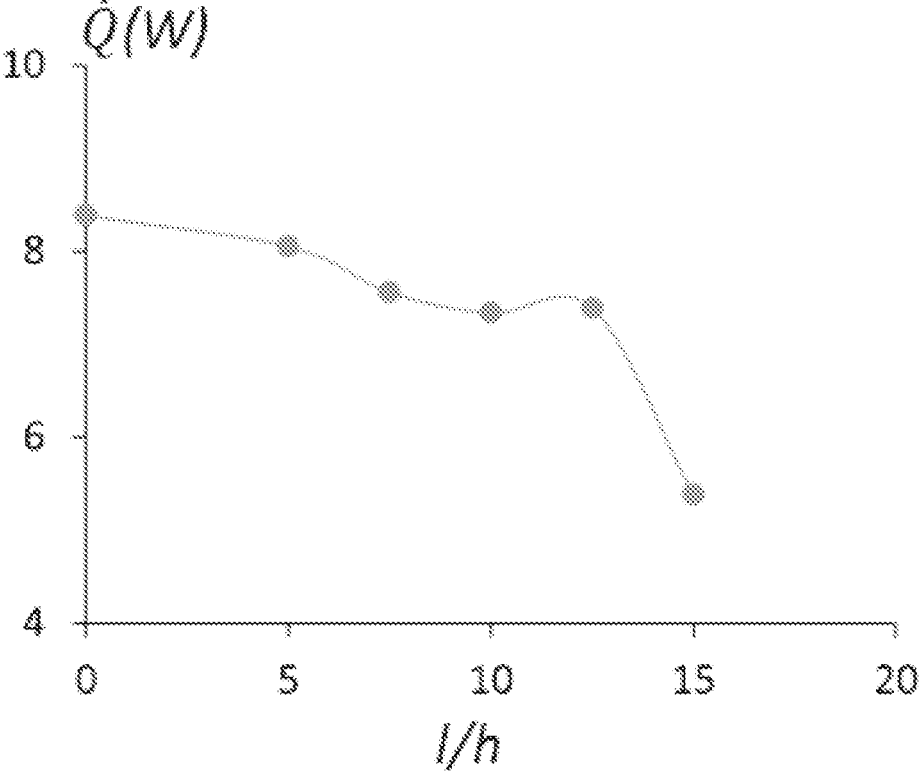

FIG. 12 shows the variation of power dissipated to air, $\dot{Q}$, with the neck aspect ratio, L/H. There is a monotonic decrease in the power dissipated to the air up to L/H=8 consistent with reducing pressure drop and from L/H=8 to 12.5 the power dissipated is almost invariant (in line with the pressure drop variation) and from L/H=12.5 to 15 there is a sharp decrease in power dissipation associated with the absence of tail end of the reed. A combination of the two global parameters ($\dot{Q}$ and ΔP) can be used to compare the performance of reeds using a $COP_{baseline}$=205, where COP=$\dot{Q}/\dot{W}$, wherein COP is the coefficient of performance, $\dot{W}$=ΔP*$Q_{flow}$ is the power required to drive the flow through the channel and $Q_{flow}$ is the flow rate through the channel in m³/s.

Figure 13:
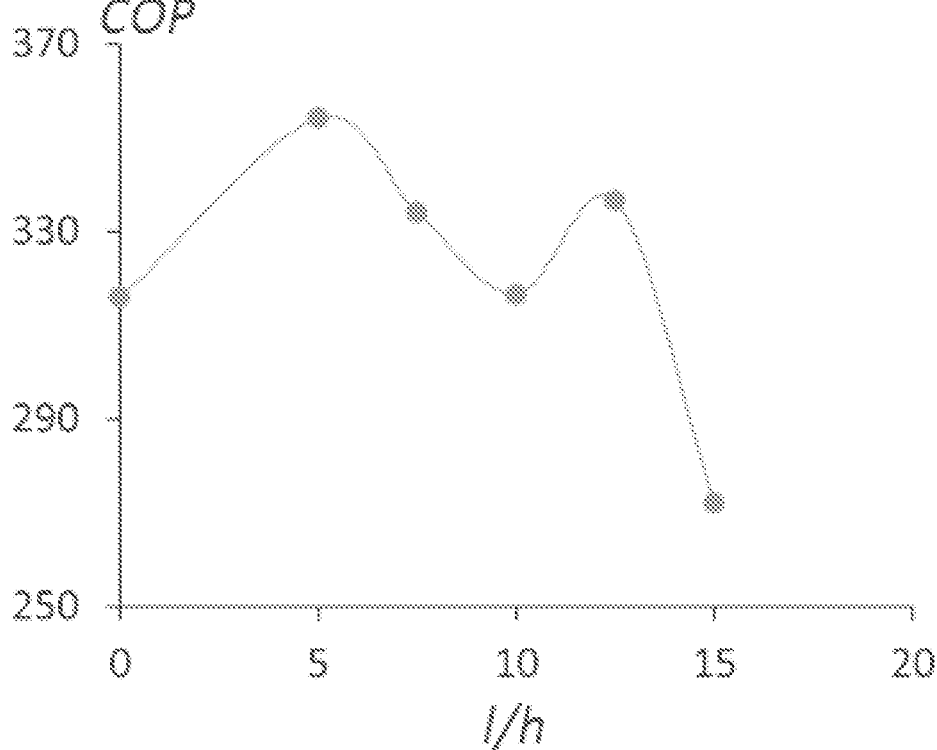

FIG. 13 shows the variation of COP with L/H. There exists a maximum for COP for L/H=5 where the reed can remove heat from the channel up to 40% more efficiently than baseline, and up to 12% more efficiently than a solid rectangular reed. An alternate way of measuring the performance of reeds is through the ratio of extra heat removed with the reed per unit extra power required (due to increase in the pressure drop in the channel), $\Delta\dot{Q}/\Delta\dot{W}$.

Figure 14:
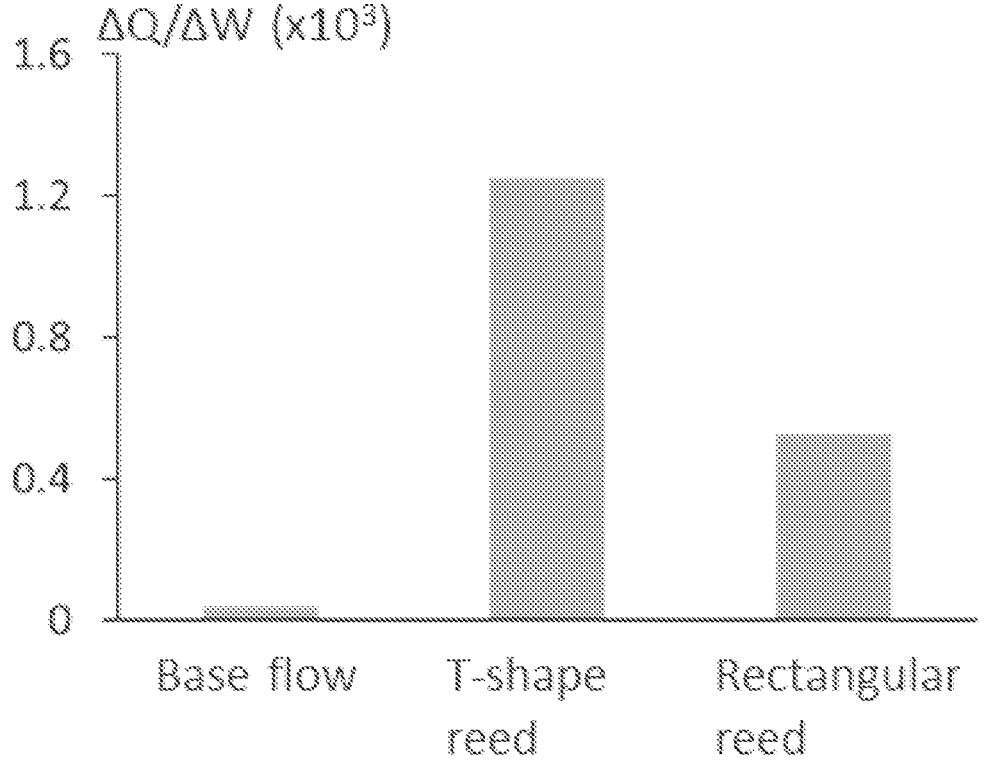

FIG. 14 compares $\Delta\dot{Q}/\Delta\dot{W}$ for three cases, namely (a) secondary baseflow where the flow rate in the absence of reeds is increased to match the power dissipation of the rectangular reed (operating at the flow rate equal to primary base flow), (b), L/H=5 T-shape reed operating at primary base flow rate and (c) rectangular reed operating at primary base flow rate. $\Delta\dot{Q}/\Delta\dot{W}$ increases from 38 for secondary base flow to 1250 for T-shape reed, an almost 33 times increment and to 530 for a rectangular reed, 14 times increment as compared to the base flow. Hence, while the rectangular reeds being in general more efficient in removing heat from the channel than the base flow, T-shape reeds are 2.4 times more efficient than the rectangular reeds (at L/H=5).

To summarize, modifying the reed frequency and shape can optimize the COP of the reed enhanced heat transfer to be up to 146% higher than for example, technology utilizing dimples.

Figure 15A:
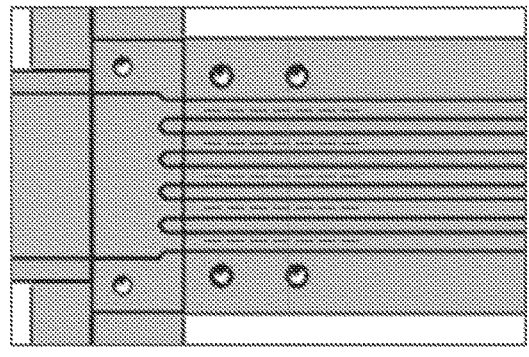
FIGS. 15A, B show the mounting of internal and external reeds in the channel, with the dotted lines showing the reeds.
Figure 15B:
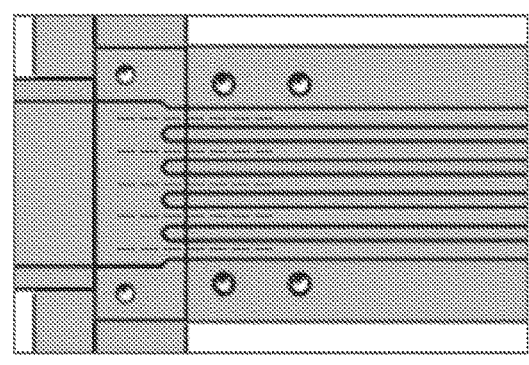
FIGS. 15C, D show the schematic of internal and external reeds within individual channels of the heat sink.

FIGS. 15A-D show the implementation of reeds in a high-performance heat sink model. The modular assembly of the heat sink and integration of reeds into the heat sink has been shown schematically. The reeds can be pulled out of the channel by varying the length of the interchangeable upstream reed mounting module. FIGS. 15A, 15B schematically show the mounting of internal and external reeds in the channel, with the dotted lines showing the reeds.

Figure 15C:
Figure 15D:
Figure 16:
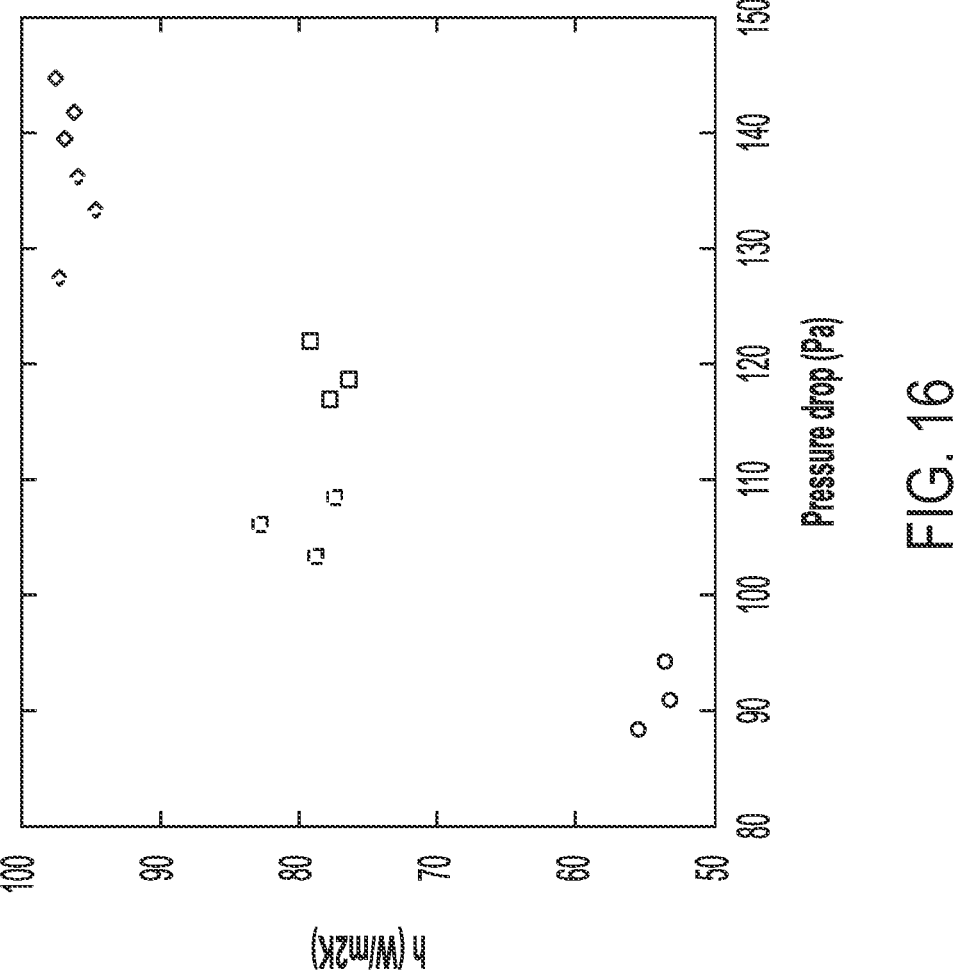
FIG. 16 is a graph of global heat transfer coefficient, h, vs overall pressure drop in the heat sink, ΔP, for baseline (●), externally mounted T-shape reeds ( ▊ ) and rectangular reeds (□) and internally mounted T-shape reeds (♦) and rectangular reeds ( ◇ ) at three values of surface heat flux.
Figures 17A, 17B, 17C:
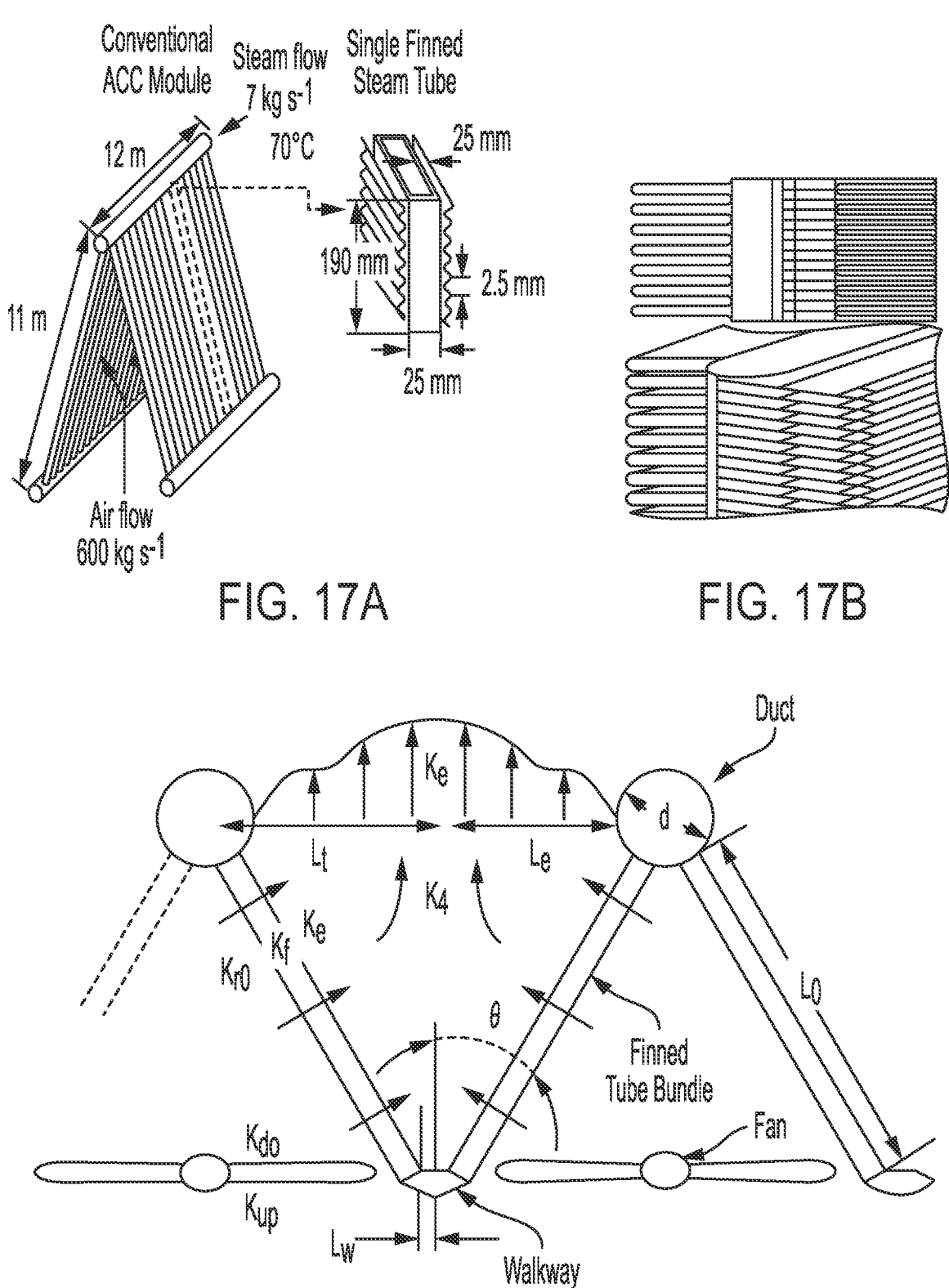
FIGS. 17A-C are schematic of an A-frame air cooled condenser used in thermo-electric powerplants (FIG. 17A), counting of SORs in the fin channels (FIG. 17B), and system level minor losses associated with the flow (FIG. 17C).
Figure 18B:
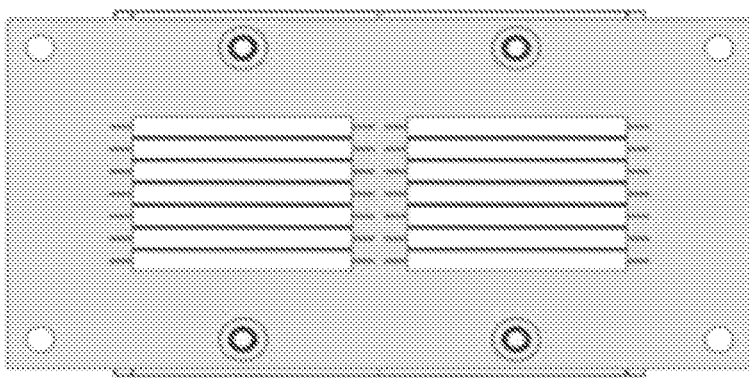
Figure 18A:
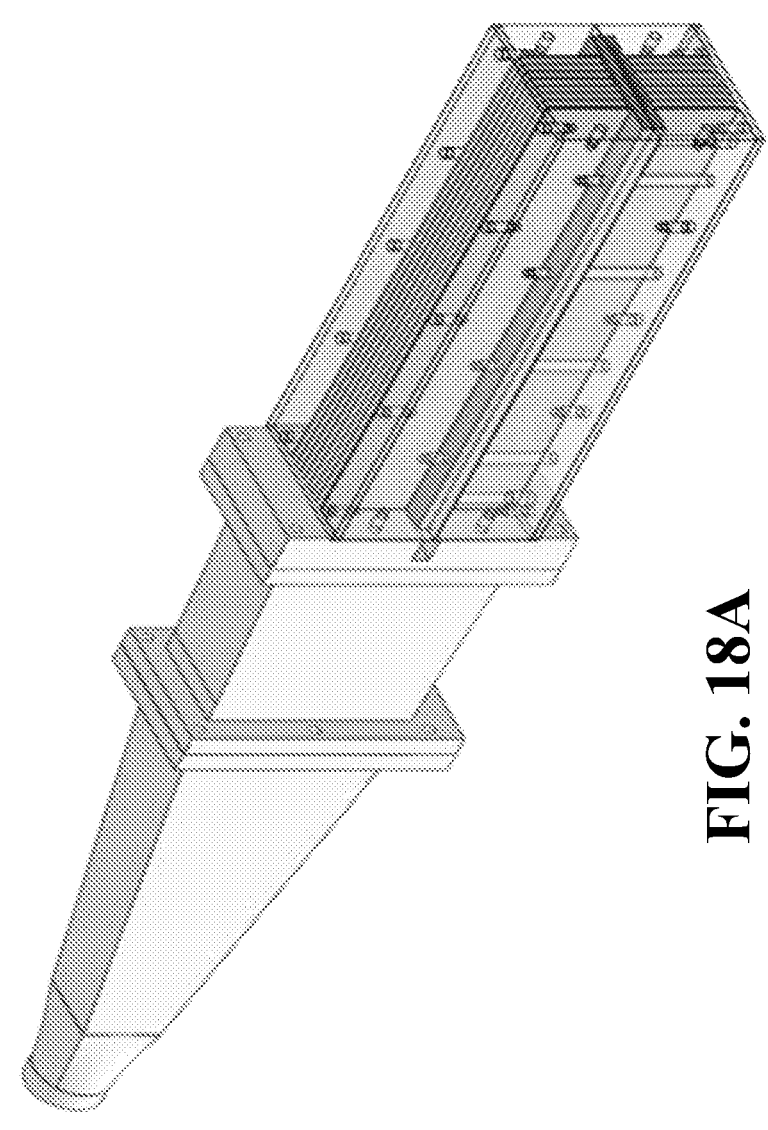

FIGS. 15C, 15D show the schematic of reeds within individual channels of the heat sink. The walls of the central fin of heat sink are instrumented with thermocouples to obtain the temperature variation along the length of the fin. There is a reduction in the fin temperature with the introduction of reeds because the reeds increase the mixing in the channel, thereby increasing the power dissipated and the effective heat transfer coefficient. A temperature probe is used and Pitot tube to measure velocity profiles at the exit plane of the heat sink. This is used to calculate the bulk mean temperature ($T_m$) of the air at the heat sink exit which can be used to calculate the overall heat transfer coefficient defined as h=$\dot{Q}$/A*LMTD, where A is the lateral surface area of the heat sink and LMTD is the logarithmic mean temperature difference between the fin and the air. The performance of T-shape and rectangular reeds were compared in both externally and internally mounted configurations in the heat sink with the base flow at three flow rates as shown in a plot of heat transfer coefficient, h versus overall pressure drop, ΔP in FIG. 16. The externally mounted reeds have a lower pressure drop as compared to the internally mounted reeds with almost similar heat transfer coefficients and this can be seen for both T-shape reeds (~20% decrease in pressure drop, or 25% increase in COP, for external reeds as compared to the internal reeds) and rectangular reeds (~10% decrease, or 11% increase in COP). Therefore, externally mounted T-shape reeds are the most efficient reeds in terms of power dissipation in the channel out of all the reeds tested. And thus, externally mounted T-shaped shaped reeds can lead to a 207% increase in COP than dimple technology.

reeds can have potential applications in dry air-cooling systems in thermo-electric power plants. FIGS. 17A-C show an A-frame ACC used in such plants with the schematic of the heat exchanger fins and implementation of reeds within the fin channels along with the minor losses associated with flow through an ACC. In order to simulate the heat exchanger fins in such systems an adiabatic double-sided heat sink was fabricated as shown in FIGS. 18A, B. There are two parts of the heat sink: the top and the bottom and a heater is sandwiched between the two parts. The sides and the top are insulated to ensure constant heat flux for all the cases; with and without the reeds. The bottom and top of the top heat sink are mounted with thermocouples along the fin length to measure fin temperature variation along the length of the heat sink.

Figures 19, 20:
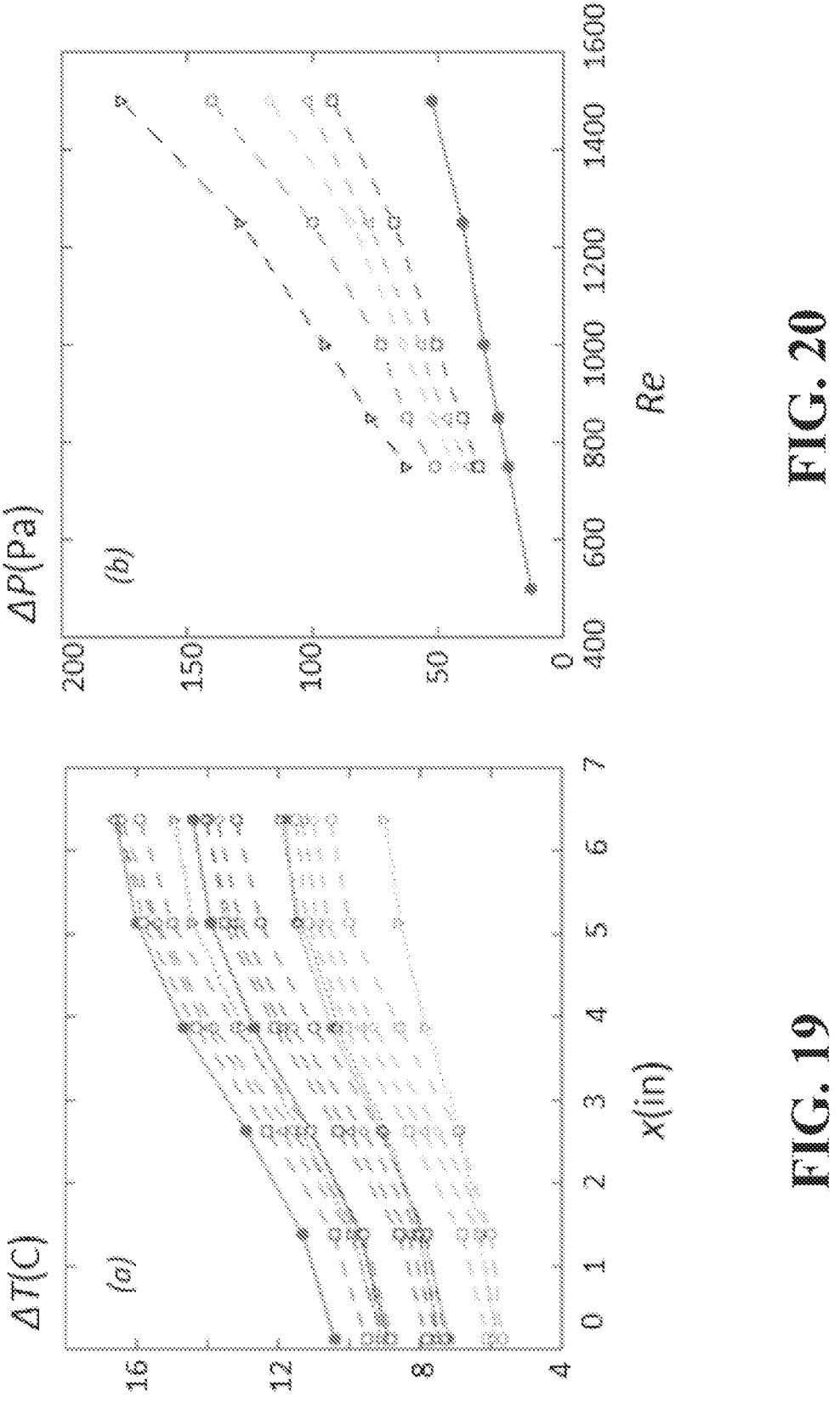
FIGS. 19-20 are graphs of the variation of wall temperature difference, ($\Delta T=T-T_a$, $T_a$ being the inlet air temperature) along the length of the fin channel with (□, Δ, ♦) and without (○) the reeds at Re=750, 1,000 and 1,500 (FIG. 19), and variation of overall pressure drop in the heat sink as a function of Re, with and without the reeds (FIG. 20).

The length of the reed was varied from 9% to 95% of the heat sink length and its effect on the fin temperature was measured as shown in FIG. 19 for three flow rates (Re=750, 1,000 and 1,500).

The reed penetration depth corresponding to each reed length is shown by a dashed line and the respective symbols for each reed length. For each flow rate, the introduction of reed decreases the fin temperature as compared to the base flow with maximum decrease observed close to the entry of the channel and a reduction in the temperature decrease close to the exit of the channel. However, with longer reeds (>50% heat sink length), reduction in fin temperatures could be observed even at the exit of the channel. FIG. 20 shows the pressure drop in the heat sink as a function of Re for different reed lengths and the base flow. As the reed length increases, the overall pressure drop increases. Since, for a constant heat flux, the fin temperatures decrease with increase reed length, for each reed length, the flow rate can be reduced to match the average fin temperature with that of the base flow (Re=1,000). Therefore, for each length there exists a distinct Re where the average fin temperature is same as that of the base flow.

The Table of FIG. 21 shows a comparison of flow associated losses in an ACC for the different reed lengths tested for their respective operating Re. As can be seen, the minor losses associated with flow outside the heat sink form a significant part of the overall system loss within the ACC and by decreasing the overall flow rate within the system, the reeds decrease the Total pressure drop within the ACC. The competing effects of reduction in the flow rate and increase in heat sink pressure drop with the increase in reed length lead to an optimal reed length (105 mm) where the overall pressure drop is 22% less than that of the base flow and the overall flow power reduction in the ACC is 45%.

The Table of FIG. 22 shows, heat transfer studies performed for this reed and comparison with the base flow at different flow rates. As can be observed, even at fixed heat flux, the reed can increment the heat transfer coefficient on an average by 25-30%. This suggest more efficient cooling for large scale systems and can favor the usage of dry air cooling versus wet evaporative cooling.

Further Advances

It was surprising to uncover that the fluttering motion of a thin film reed within channels leads to significant enhancement in heat transfer within these channels. Innovative techniques around this concept can be utilized to maintain the heat transfer while significantly reducing the increment in channel losses, thereby enabling an optimization of thermal performance. In one example, the thermal performance of the reed as measured by the COP is shown to be 146% higher than conventional technologies.

Advances include reducing the reed frequency. While it is intuitive that for a given flow condition i.e., Re, channel geometry and shape of the reed, reducing the reed frequency should decrease both the heat transfer enhancement and channel flow losses, it was surprisingly discovered that by reducing the reed frequency, the channel losses can be significantly reduced with negligible reductions in heat transfer enhancement. The reed frequency which is a function of the reed's structural and geometrical properties and the flow speed can then be controlled to yield the best thermal performance (up to 121% higher than conventional technologies).

Advances additionally include location of the reed in the channel. Again, while it is intuitive that by pulling the reed partly upstream of the channel inlet, both the heat transfer and channel flow losses should decrease, it was discovered that by pulling the reed upstream, the channel flow losses decreases while the heat transfer enhancement does not change significantly.

Advances additionally include the shape of the reed. An optimal shape of the reed was obtained which yielded an additional improvement (12%) over the rectangular shape of the reed.

Advances additionally include microfabricated structures on the reed. The channel losses are significantly affected by the interactions between reed and channel walls, with the suction between the walls and the reed being a primary driver of the channel losses. By creating microstructures on the reed, the wall suction can be prevented.

Advances additionally include that the contact of the reed with the channel walls can be controlled by charging the reed and the (metal) walls electrostatically with the same polarity at virtually no power cost. This way, the reed impact on the walls can be regulated.

SORs can be fabricated over a broad range of scales using advanced, batch micro fabrication approaches. The reed design includes a flag made out of polymer material (or metal) using laser micromachining. MEMS technologies have the potential to fabricate these structures at low cost using a mass manufacturing approach. Further, additional features can also be fabricated. Such features can enhance the displacement, decrease the pressure drop across the reed, and even tune the reed behavior to a specific flow regime.

As discussed, the microfabricated polymer-based self-oscillating reed can have corrugations. The corrugations prevent from wall suction phenomenon, which was observed with standard (i.e., non-corrugated) SORs. This device was fabricated by laminating pre-patterned sheets of polymer materials. Other compatible processes such as embossing and/or molding techniques can be considered for micro-structuring of polymer or metal SORs.

As discussed, the system performance enhancement with the present reed technology is unmistakable. Traditional heat sinks used in large-scale air-cooling systems such as ACCs typically comprise of high fin-density narrow channels with cross-sections typical 1 in.×0.1 in. While the high fin density promotes a higher heat transfer due to an increased surface area, it also increases the primary and secondary viscous flow losses.

It has been shown that the reeds can enable migration to wider channels while maintaining similar heat transfer. This can lead to significant reductions in system flow losses and fan power with a potential to increase the thermal efficiency of the units within which the ACCs operate (such as a thermal power plant or a chemical processing plant).

Further, an innovative pneumatic reed mounting system is herein disclosed. The implementation of reeds within large scale systems such as ACCs can be challenging because of the large number of fin-channels (~20,000) and the electro-static interactions between the thin-film reeds and the fin-channel walls. A pneumatic system was designed which enables fast and hassle-free mounting/unmounting of multiple reeds at a time.

While current channel heat transfer augmentation technologies can enhance heat transfer significantly, they are limited by even higher accompanying channel losses. As an example, dimples on channel surfaces can achieve up to a 150% increase in heat transfer (Q) and a 450% increase in channel losses ($\Delta P$). One can get even better heat transfer while controlling the channel losses to a significantly lower level. For example, with a reed (50 mm×23 mm×12.5 µm), it was found that a heat transfer increment of 171% was achieved with channel losses increasing only by 169% under similar flow conditions.

Furthermore, it is herein demonstrated that the reed driven channel losses can be significantly lowered without altering the heat transfer increment by optimizing the geometric and structural properties of the reed and reed mounting locations relative to the channel (internal or external) resulting in heat transfer enhancement factor up to 150% higher and the COP up to 121% higher than conventional technologies (such as dimples and vortex generators). Further, heat transfer enhancement was explored by embossing advanced microstructures on the surface of the reed.

While the present heat transfer technologies such as dimples lead to permanent modifications of the channels, thus limiting their usage and modification, the current reed technology is retroactive and can be replaced easily without significant changes to the existing channel. A pneumatically assisted reed mounting module was designed to facilitate rapid and precise mounting and disassembly of optimal reed arrays to and from ACCs.

The presence of the reed and the induced small-scale motions lead to an enhancement in heat transfer and an increase in channel losses which are characterized by Nusselt number and channel friction factor:

$$f = \frac{\Delta P D_h}{0.5 \ \rho U^2 L} \tag{4}$$

wherein $\Delta P$ is the pressure drop in the channel, U is the average channel flow velocity, L is the length of the channel and $D_h$ is the hydraulic diameter), respectively. The reed performance is determined by the Thermal enhancement factor (TEF) which is a ratio of relative heat transfer enhancement to relative channel losses increment in the presence of the reed over the baseline. For example, with a reed (50 mm×23 mm×12.5 µm), thermal enhancement factor is 1.1. By comparison, longitudinal rows of vortex generators in a similar channel and flow configurations yielded a thermal efficiency of 0.67 (compared to 1.1 in the present channel). Similarly, dimples and protrusion yield an even lower efficiency of 0.45.

Figure 23:
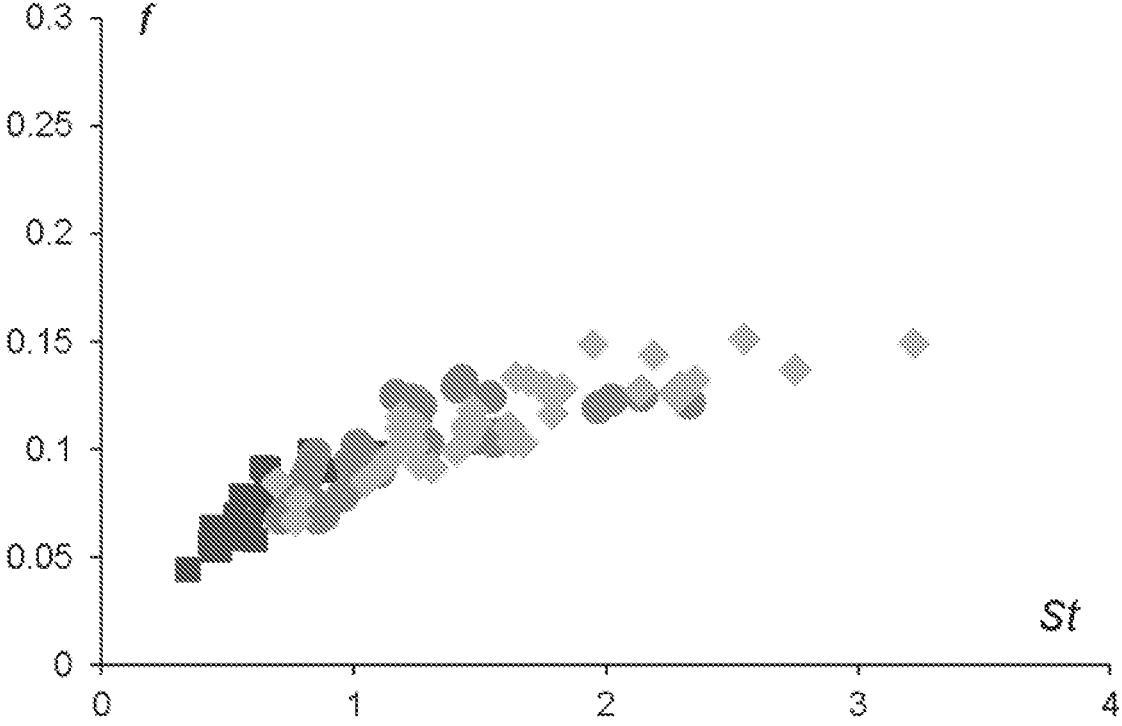
FIGS. 23-24 are graphs of the variation of friction factor, f, in the presence of the reed with reed St (FIG. 23), and reed St with the product of reed mass ratio and rigidity, $M^*(K_b)^{0.5}$ for 1,000<Re<10,000 and L/H=10 (■), 20 (●), 30 (♦) in the 5 mm channel (FIG. 23).

The present investigations have demonstrated that the flow losses associated with the reed (as measured by f) strongly depend on the reed oscillation frequency, characterized by the reed's reeds Strouhal number:

$$St = \frac{\Phi L}{U} \tag{5}$$

where $\Phi$ is the frequency of oscillation of the reed (measured 5 mm upstream of the reed tip at midspan, FIG. 23). The present experiments assessed the effects of reed's oscillation on the channel flow losses over a range of Re (1,000<Re<10,000) using three reed lengths (L/H=10, 20, 30, L being the length) and seven reed thicknesses (12.5<t<187.5 µm).

Figure 24:
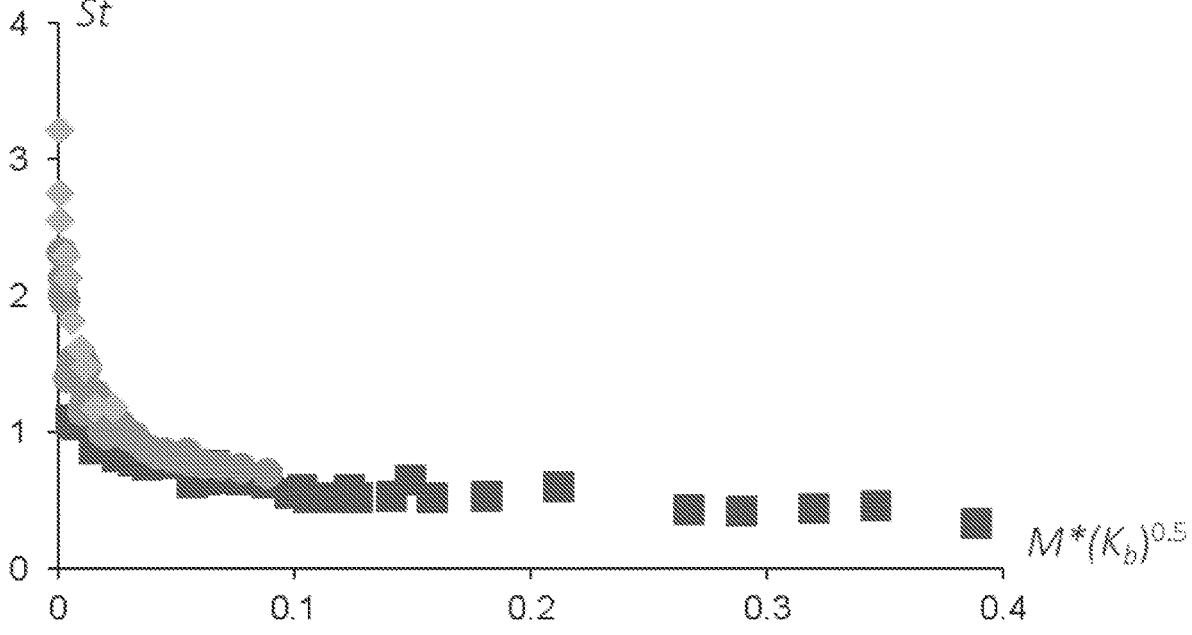

It is remarkable that in the presence of the reeds f does not change significantly with Re or L/H but primarily increases with St with a diminishing rate. In fact, f increases 3.3 times for 0.3<St<3.6. The reed Strouhal number depends on the geometric properties of the reed and is characterized by M* and $k_b$ as can be seen in FIG. 23. The reed Strouhal number decreases with the increasing $M^*(k_b)^{0.5}$ and becomes nearly invariant (about 0.4) for $M^*k_b>0.2$. FIGS. 23-24 indicate that by changing the structural and geometric properties of the reed, the flow losses in the channel can be significantly mitigated.

Figure 25:
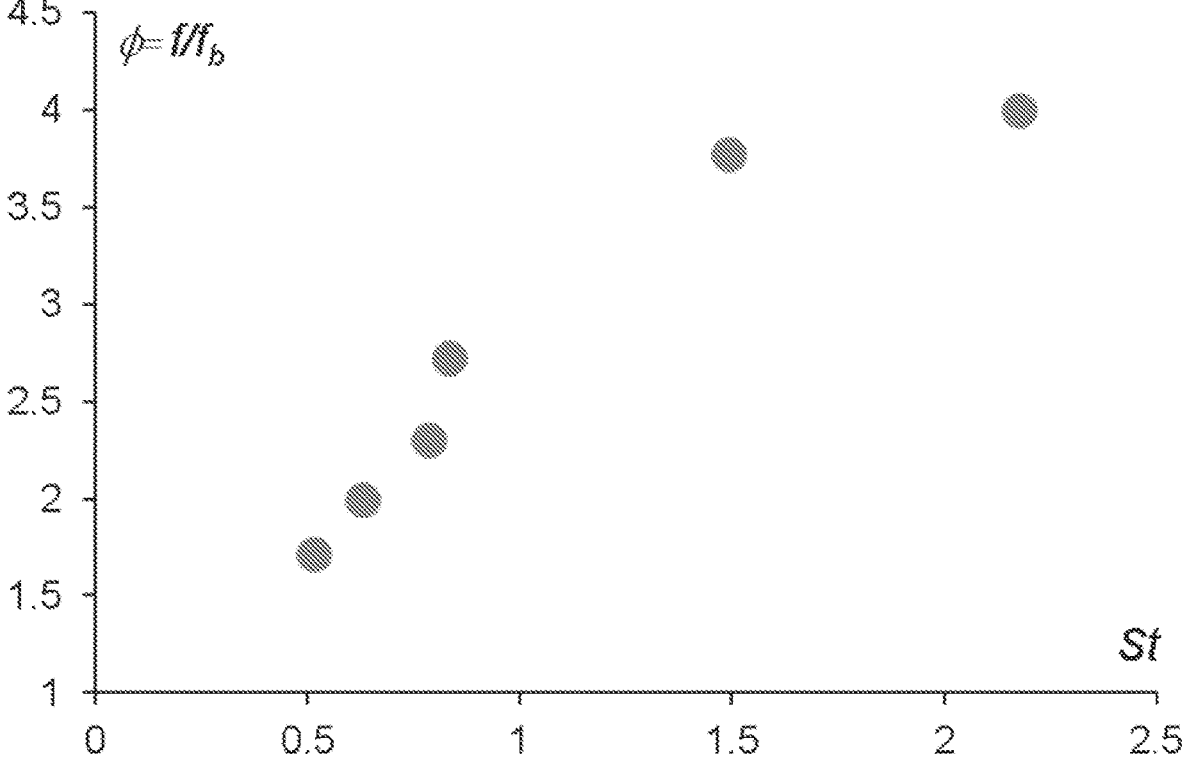
FIGS. 25-26 are graphs of the variation of relative increment in friction factor, $\phi$, (FIG. 25), and Nusselt number enhancement, η in the presence of the reed with reed St for Re=5,000 (FIG. 26).
Figure 26:
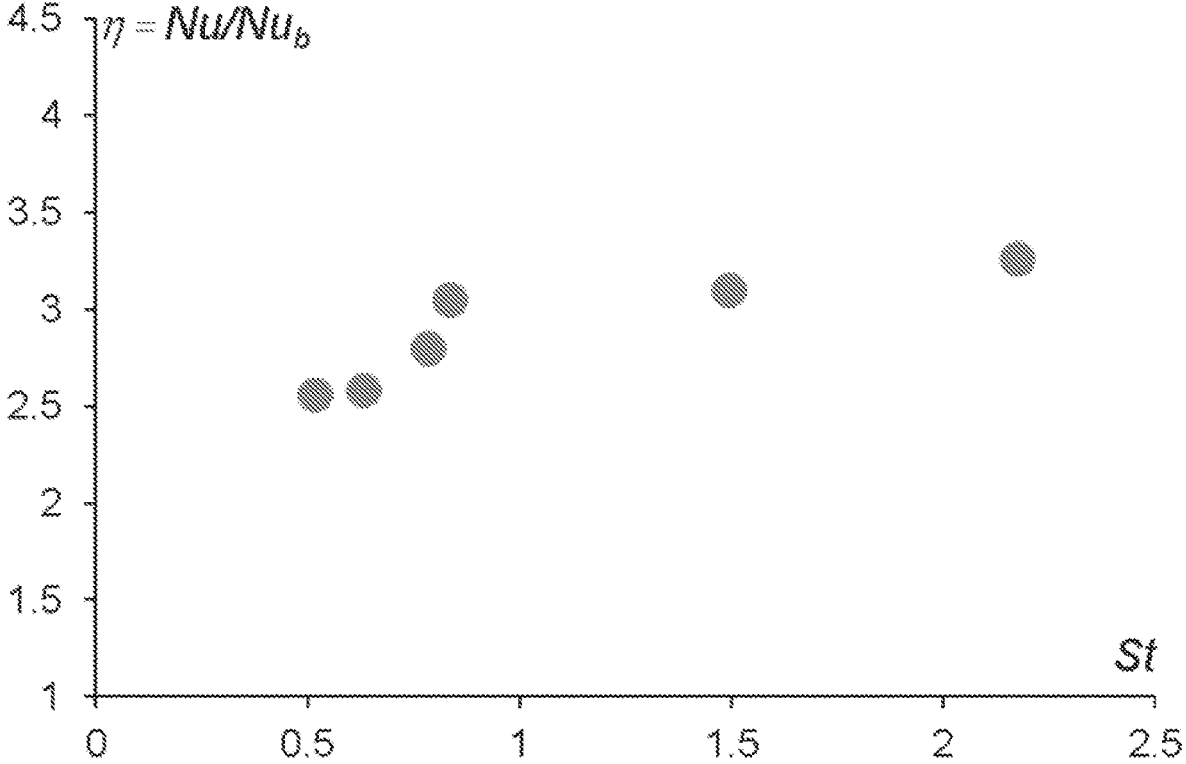

The flow losses induced by the reed can be mitigated by selecting the reed characteristics so that it oscillates at low St. FIG. 25 illustrates this effect for Re=5,000 by demonstrating that the relative increment in friction factor in the presence of reed, $\phi=f/f_b$, increases by over 130% as St increases by 300% (0.5<St<2.17). On the other hand, FIG. 26 shows that for Re=5,000 ($ITD_{max}=60°$ C.), $\eta=Nu/Nu_b$ increases only by 24%.

Figure 27:
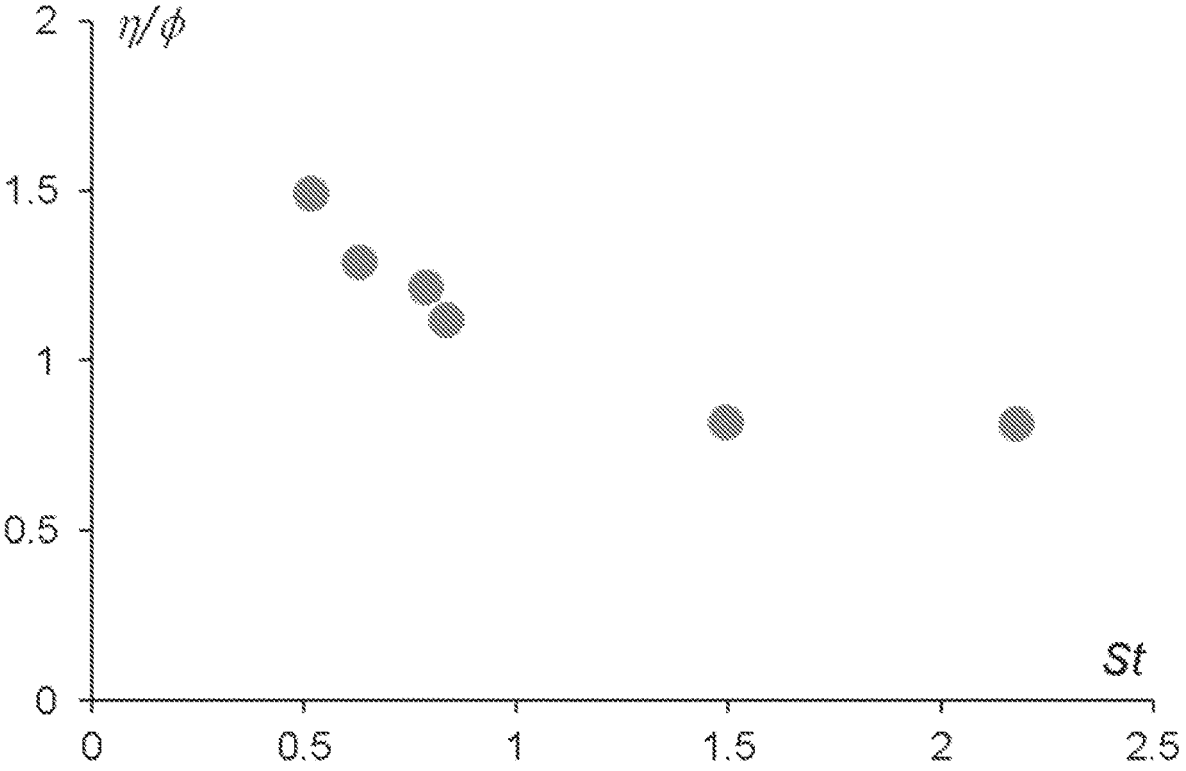
FIG. 27 is a graph of the variation of efficiency of thermal enhancement, η/φ with reed St for Re=5,000.

This indicates that by reducing the operating frequency of the reed it is possible to reduce the flow losses significantly while maintaining the Nusselt number enhancement. Consequently, as shown in FIG. 27, the thermal enhancement efficiency in the presence of the reed, $\eta/\phi$, increases as the reed St decreases. The thermal enhancement efficiency increases by 88% for 0.51<St<2.17 to a maximum $\eta/\phi=1.5$ (compared to 0.67 for vortex generators and 0.45 for dimples). Alternatively, the Coefficient of performance, COP with the reed is 121% higher.

Figure 28:
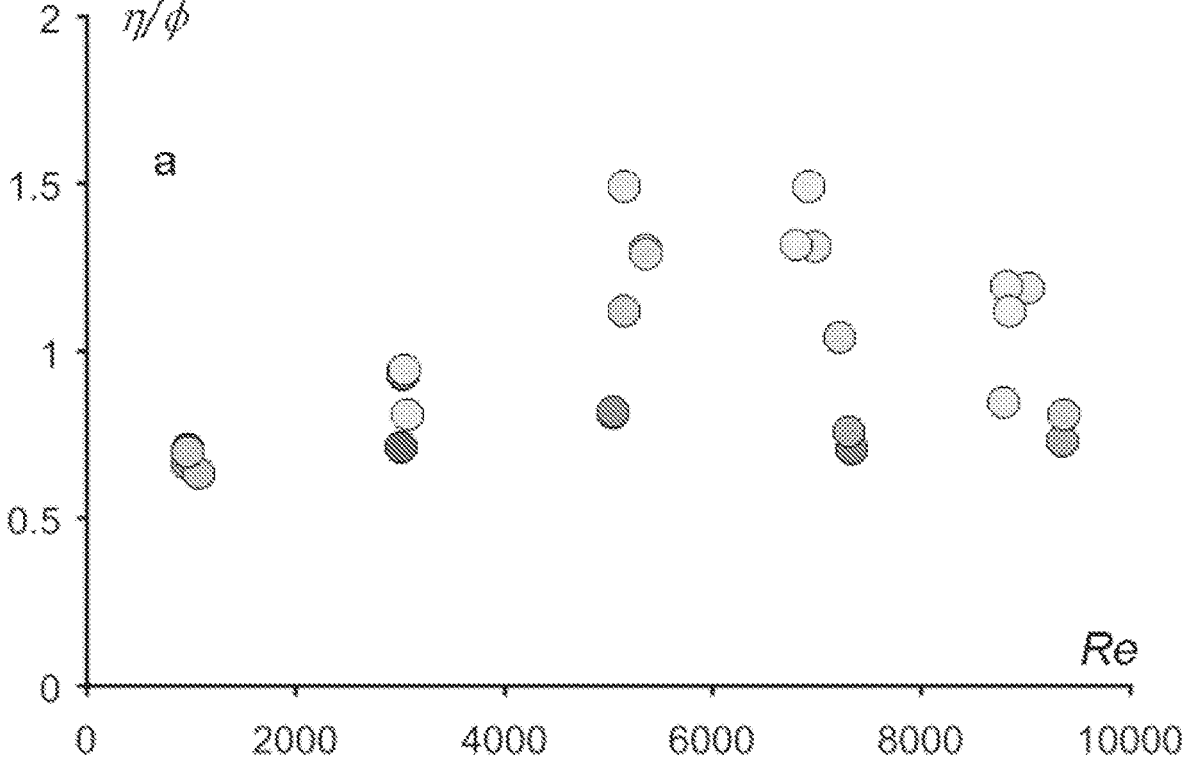
FIGS. 28-29 are graphs of the variation of the efficiency of thermal enhancement, (η/φ) (FIG. 28), and the sensitivity ζ of thermal enhancement efficiency to reed Strouhal number with Re for 0.5<St<2.5 in the 5 mm channel.
Figure 29:
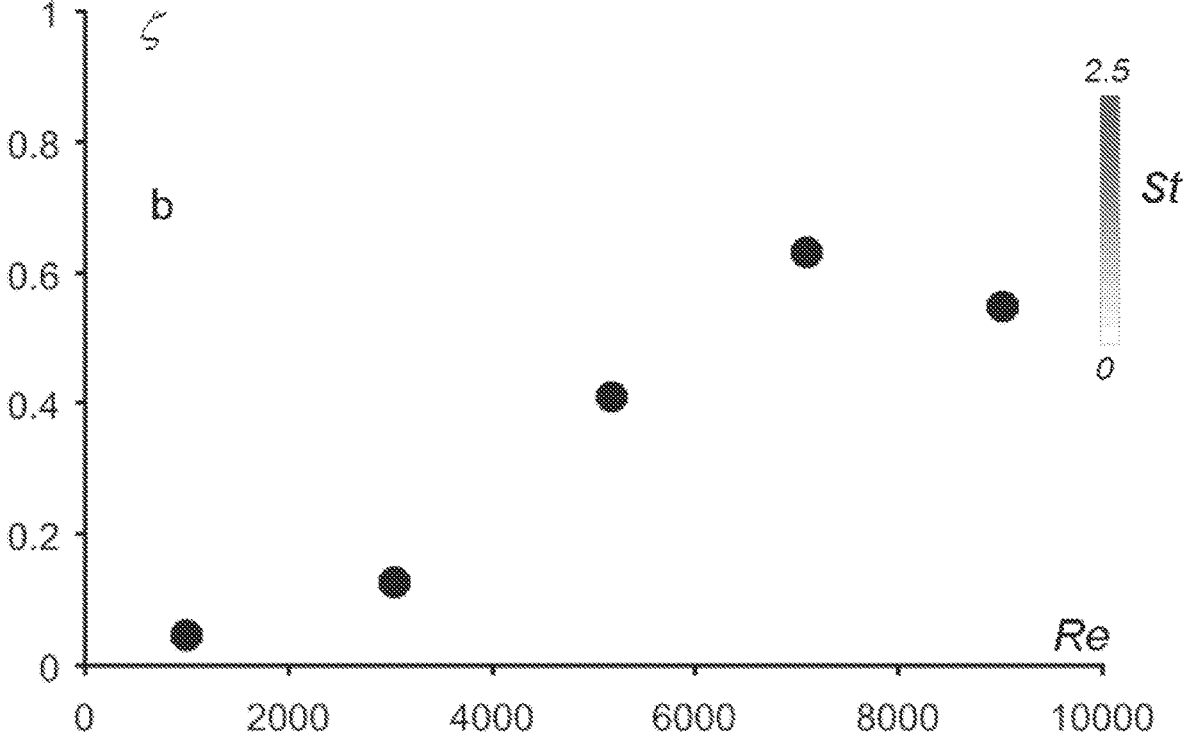
Figure 32:
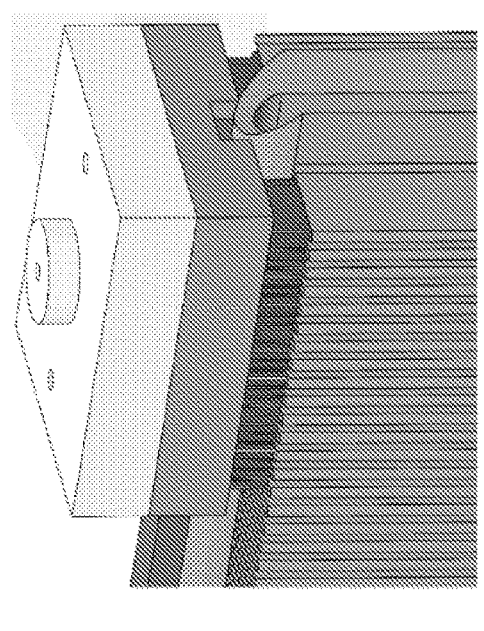
FIGS. 30-32 illustrate reed stacking frame mounted with reed arrays (FIG. 30), reed alignment block with guides insert into the intra-reed spacing (FIG. 31), and reed alignment block used to precisely place reed stacking frames into the intra-fin spacing of an ACC (FIG. 32).

The trends demonstrated in FIG. 27 indicate that it may be possible to increase the thermal enhancement efficiency by reducing the reed's operating Strouhal number. These effects were investigated for 1,000<Re<10,000. FIG. 28 shows the variation of $\eta/\phi$ with Re for 0.3<St<2.5 which indicates that the thermal enhancement efficiency ($\eta/\phi$) increases by reducing St at all Re. The sensitivity of the thermal enhancement efficiency to the reduction in St as characterized by the ratio:

$$\zeta = \Delta \left(\frac{\eta}{\phi}\right)_{max} / \Delta (St)_{max} \tag{6}$$

is shown in FIG. 29 which shows that the sensitivity, $\zeta$ increases through Re=7,000 and then decreases as the base flow transitions to turbulence somewhat reducing the reed's thermal enhancement but still showing significant improvement over the base flow.

As noted, the present invention further comprises pneumatically assisted reed mounting technologies, including a module designed to facilitate rapid mounting of reed arrays on ACCs.

Almost every process in CPI involves heat transfer. Integrated functioning of a variety of heat exchangers with gas, liquid, and vapor/liquid flows of single- and multi-component working fluids, is critical in any processing plant. Improving air- and/or process-side performance can significantly reduce energy consumption and capital costs. While the present invention comprises an integrated approach to develop, test, and demonstrate, in a range of advanced heat exchanger configurations, innovative air- and process-side heat transfer technologies, on the air side the present invention's use of arrays of autonomously-fluttering intrafin reeds induce significant mixing and enhance air-side heat transfer by as much as 300%, with minimal penalty in pressure drop and system fan power.

For two-phase process-side heat transfer, low-power ultrasonic actuation applied at the system boundary actuates the liquid/vapor interface and can significantly accelerate direct-contact condensation at atmospheric and reduced pressures. These innovations overcome the limitations of conventional approaches that have relied, with limited success, on passive, geometrically complex designs (flow passages and surface protrusions) burdened with significant flow losses.

The present technologies are easily incorporated into new and existing equipment designs, thus allowing for "swap-in/swap-out" retrofit.

Reed and ultrasound technologies for heat transfer enhancement in condensers is investigated, identifying reed geometries (characterized by width, length, and thickness), reed materials (characterized primarily in terms of elastic modulus and chemical resistance) and reed array configurations. The reed and ultrasound technologies were placed into a relatively small industrial condenser, and tests performed to measure performance under real-world conditions, including flow maldistribution on the air side.

Figure 30:
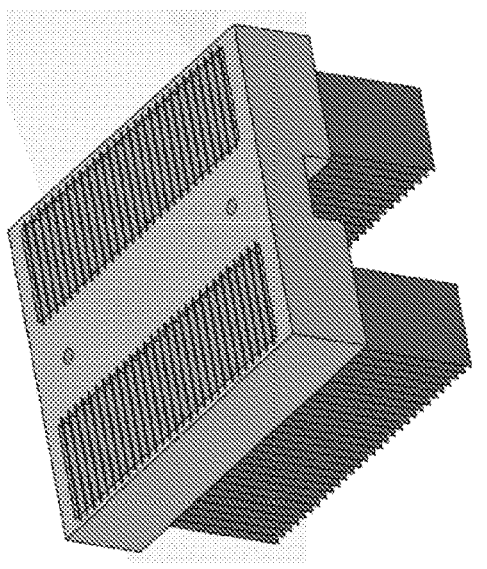

This design includes a reed stacking frame on which the reeds can be mounted and a pneumatic alignment block with guides and air channels which enable precise intra-fin mounting of the reeds. The reeds can be robotically integrated into the stacking frame, creating a reed array as shown in FIG. 30.

Figure 31:
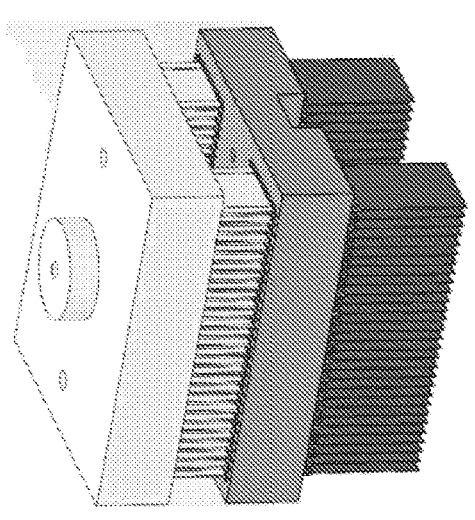

An alignment block (FIG. 31) with guides can then be inserted into the intra-reed spacing which results in electrostatic alignment of reeds to the guides. Each guide has a U-shaped cross section which forms a guide channel with the reed on one side and guide walls on the other, with the channel width linearly decreasing along the height of the guide.

Figure 34:
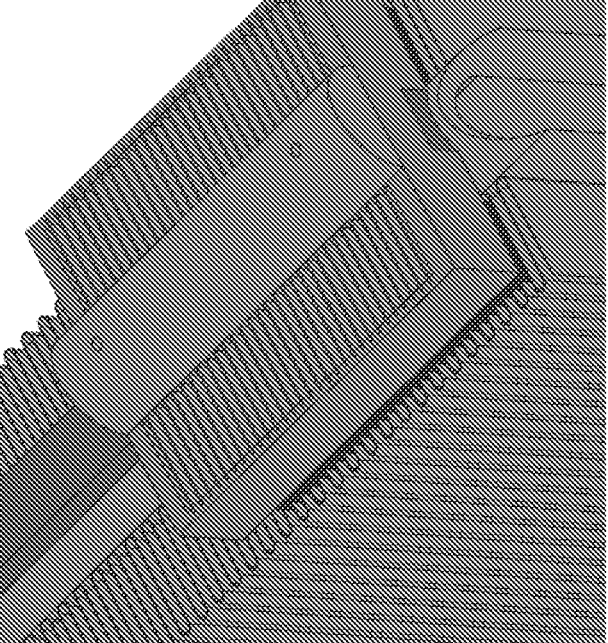
FIGS. 33-34 illustrate pneumatic detachment of the reeds by airflow through converging guide channels (FIG. 33), and assembly of modular reed stacking frames into the intra-fin spacing with front face attached with a bull nose (FIG. 34).
Figure 33:
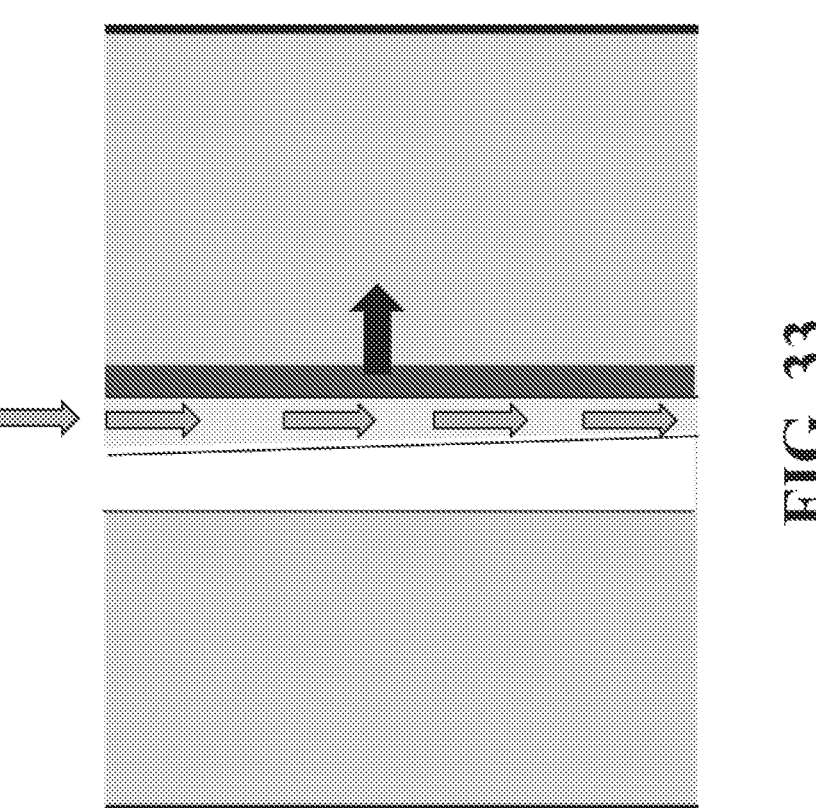

The alignment block is then screw mounted to the stacking frame and the assembly is mounted on a rail on top of the ACC frame which enables precise intra-fin placement of reed stacking frame. Consequently, controlled airflow can be supplied to the alignment block guide channels, slowly detaching the reeds from the guides (FIG. 33), followed by removal of alignment block. In order to suppress flow separation from the flat edges of the stacking frame, a bull nose is screwed on top of the stacking frame (FIG. 34). Multiple modules of the stacking frames can be similarly integrated to cover the span of ACC.

The present invention provides transformative improvements of air-side heat transfer using aeroelastically-fluttering reeds to reduce high thermal resistance in finned configurations, with relatively small flow penalties. Tests on a multi-channel open-return finned testbed with controlled surface film resistance heaters simulating heat transfer from the process side, with arrays of embedded thermocouples and pressure sensors to measure heat transfer coefficients (h) and pressure drop ($\Delta P$) with and without reeds, was performed and driven by a metered, temperature-controlled ($\pm 0.1°$ C.) source to mimic the range of flow rates (and Re within the fin channels) and air temperatures in applications.

Figure 35:
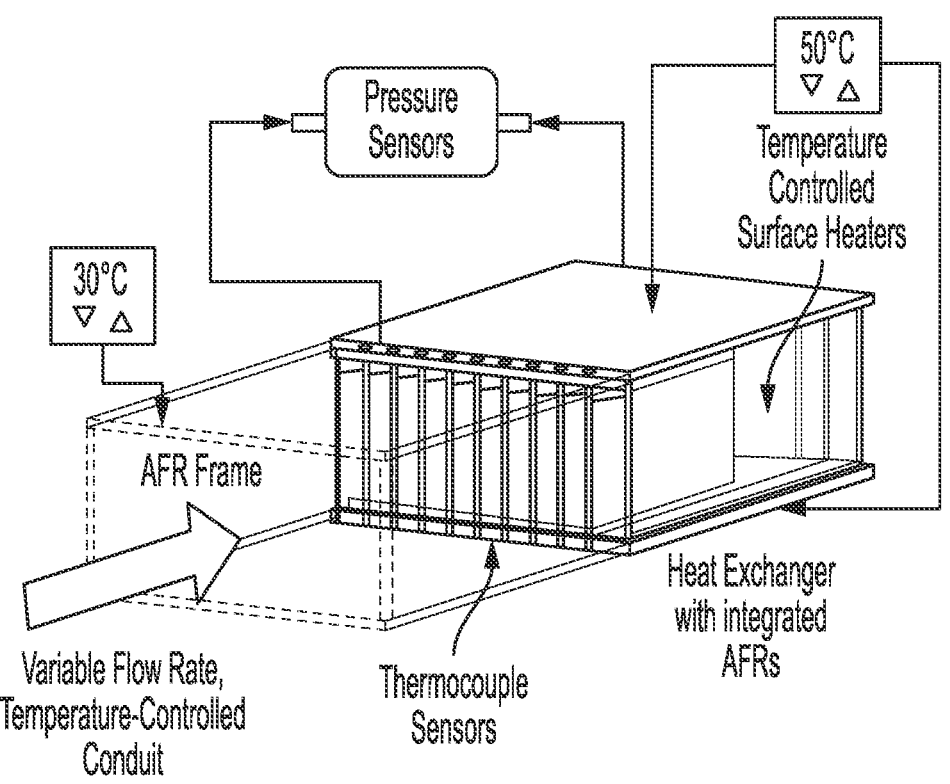
FIG. 35 is a schematic of reed arrays mounted on inlet frames are inserted in air-side heat exchanger models.
Figure 36:
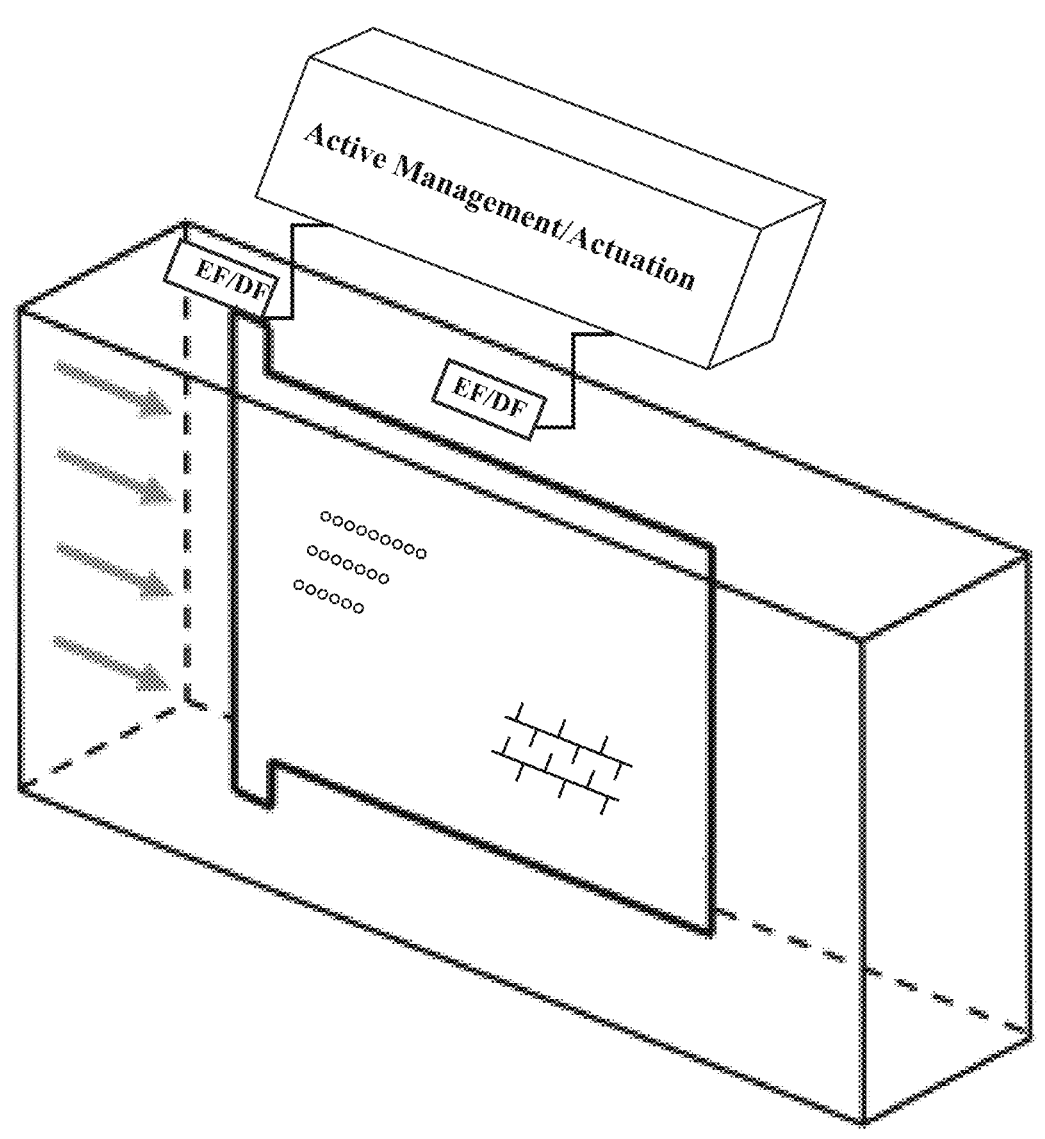
FIG. 36 is a schematic of actively managed reed within a channel according to an exemplary embodiment. One or more exemplary reeds can be fabricated with microstructures (shown representatively as ₀₀₀ and ⊣ ) on the reed and located in such a way that its reed frequency is at least partially dependent on outside and/or intelligent control, like a mechanical actuator that dampens the otherwise "passive acting" reed frequency, or via the implementation electro-static interactions between the thin-film reeds and fin-channel walls that are actively managed. In this way, it can be considered an active reed.

As shown schematically in FIG. 35, reed arrays mounted on inlet frames are inserted in air-side heat exchanger models. The set-up will enable detailed measurement of h and $\Delta P$ in the absence (baseline) and presence of reeds of varying geometry and mechanical properties. Effects of reed interactions with the cooling air flow will be studied over a range of channel height to reed length ratio $H^*=H/L$, $Re_H=HU/v$, reduced velocity $U^*=UL(\rho_{air}WL/B_{reed})^{0.5}$, inertia ratio $M^*=\rho_{reed}t/\rho_{air}L$, and bending stiffness $B_{reed}=EI$.

Reed-induced changes in thermal resistance and h were characterized in detail. Reed motion and the air velocity field was measured using laser diagnostics in a geometrically identical transparent model. Overall $\Delta P$ was measured to quantify changes in required fluid power, and hence COP. Reed thermal gain was assessed by measuring flow rates for the enhanced and baseline flows, matched to have the same heat transfer rate at a given temperature difference.

The investigation identified reed configurations optimizing an economic measure of heat transfer enhancement and pressure drop penalty, and explored reed array insertion and mounting. Fatigue life was evaluated. Effects of self-fluttering reeds on heat transfer in air-side channels were also modeled computationally using the production-quality, spectral-element CFD code Nek5000, with a well-developed capability to deal with moving-boundary problems that occur in flow-induced vibration (FIV) in the Re ranges appropriate to the experiments. For some cases, the flow was turbulent. Reed deformation was handled by spectral-element discretization of reed shape.

It is to be understood that the exemplary embodiments and claims disclosed herein are not limited in their application to the details of construction and arrangement of the components set forth in the description and illustrated in the drawings. Rather, the description and the drawings provide examples of the exemplary embodiments envisioned. The exemplary embodiments and claims disclosed herein are further capable of other exemplary embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the exemplary embodiments and claims presented in this application. It is important, therefore, that the claims be regarded as including such equivalent constructions.

We claim:

1. A process of low Reynolds number heat transport comprising:

flowing media within a channel having an actuated oscillating reed oscillating at a reed frequency within a path of the flowing media;

determining, using a system of sensors and processing:
    overall thermal performance of the process;
    channel flow losses of the process; and
    heat transport of the process; and intelligently reducing the reed frequency until reaching a final reed frequency;

wherein:
    reducing reed frequency improves heat transfer and efficiency of the process;
    the final reed frequency is reached when at least one of:
        a reduction in reed frequency beyond the final reed frequency decreases the overall thermal performance of the process; or
        a reduction in reed frequency beyond the final reed frequency decreases channel flow losses in an amount less than a decrease in the heat transport; and
    the system of sensors comprise one or more sensors selected from a group consisting of a temperature sensor, a pressure sensor, a heat flux sensor, a vibration frequency sensor, a flow rate sensor, a velocity flux sensor, a thermocouple, an ultrasonic sensor, and a combination thereof.

2. The process of claim 1, wherein:

the reed frequency is dependent upon at least one of:

an actuating force;

one or more characteristics of the flowing media;

one or more characteristics of geometrical properties of the channel;

one or more structural properties of the reed; or one or more geometrical properties of the reed; and reducing reed frequency is selected from a group consisting of reducing a speed of the media flow, applying an electromagnetic force to the reed, applying an electromagnetic force to at least a portion of the channel, applying a dampening force to the reed, and a combination thereof.

3. The process of claim 1, wherein:

the reed comprises an aero-elastically thin-film reed;

the channel has a channel height; and the reed spans the channel height.

4. The process of claim 1, wherein:

the channel has a channel height;

the channel further has one or more additional actuated oscillating reeds; and each actuated oscillating reed is an aero-elastically thin-film reeds oscillating at a respective reed frequency, and spanning the channel height within the path of the flowing media.

5. The process of claim 1, wherein intelligently reducing the reed frequency decreases the channel flow losses in an amount greater than the decrease in the heat transport, increasing the overall thermal performance of the process.

6. The process of claim 1, wherein a totality of the reed is positioned within the channel.

7. The process of claim 1, wherein at least a portion of the reed is positioned upstream an inlet of the channel.

8. The process of claim 1, wherein:

the channel further has one or more additional actuated oscillating reeds, all the reeds located within the path of the flowing media;

the path of the flowing media is contained in a heat transfer system;

the reeds are aero-elastically thin-film reeds; and the aero-elastically thin-film reeds are housed within a reed array unit that is separable from the heat transfer system.

9. The process of claim 8 further comprising mounting the reed array unit into the heat transfer system.

10. The process of claim 9, wherein the mounting comprises pneumatically assisted mounting.

11. The process of claim 1, wherein at least a portion of outer surfaces of the reed comprises microstructures.

12. The process of claim 1, wherein:

the channel further has one or more additional oscillating reeds oscillating at reed frequencies within the path of the flowing media; and a portion of the additional oscillating reeds are passively oscillating reeds oscillating at frequencies dependent upon:

one or more characteristics of the flowing media;

one or more characteristics of geometrical properties of the channel;

one or more structural properties of the reed; and one or more geometrical properties of the reed.

\* \* \* \* \*